(12) United States Patent
Lee et al.

(10) Patent No.: US 9,924,482 B2
(45) Date of Patent: Mar. 20, 2018

(54) UNIQUE WORD (UW) BASED MULTIPLE ACCESS MESSAGE PROCESSING

(71) Applicant: Hughes Network Systems, LLC, Germantown, MD (US)

(72) Inventors: Lin-Nan Lee, Potomac, MD (US); Liping Chen, Bethesda, MD (US); Victor Liau, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 68 days.

(21) Appl. No.: 15/185,016

(22) Filed: Jun. 16, 2016

(65) Prior Publication Data

US 2016/0374037 A1 Dec. 22, 2016

Related U.S. Application Data

(60) Provisional application No. 62/180,948, filed on Jun. 17, 2015, provisional application No. 62/180,957, filed on Jun. 17, 2015.

(51) Int. Cl.
*H04W 72/04* (2009.01)
*H04W 56/00* (2009.01)
(Continued)

(52) U.S. Cl.
CPC ............ *H04W 56/005* (2013.01); *H04B 1/69* (2013.01); *H04L 25/03872* (2013.01);
(Continued)

(58) Field of Classification Search
CPC ........... H04W 56/005; H04W 74/0858; H04W 24/08; H04W 74/08; H04W 56/00; H04L 25/03872; H04L 25/03
See application file for complete search history.

(56) References Cited

U.S. PATENT DOCUMENTS 7,359,705 B2 4/2008 Kornprobst
8,098,645 B2 1/2012 Yee et al.
(Continued)

FOREIGN PATENT DOCUMENTS

WO WO2001072081 A1 9/2001

OTHER PUBLICATIONS

USPTO, "International Search Report & Written Opinion", PCT/US2016/037946, dated Sep. 22, 2016.

*Primary Examiner* — Andrew Lee
(74) *Attorney, Agent, or Firm* — Potomac Technology Law, LLC

(57) ABSTRACT

A communications terminal receives a data communications signal via a random access channel. A processor searches for data bursts in a first time-slot that include one of a first set of signature sequences assigned to the first time-slot. When a data burst A in the first time-slot includes one of the first set of signature sequences, the data burst A in the first time-slot is an initial burst of a message from a first communications terminal. The processor determines whether a second time-slot includes a data burst B that includes the one signature sequence. When the second time-slot includes the data burst B, the message is a multi-burst message and that the data burst B is a second burst of the multi-burst message. When the second time-slot does not include the data burst B the message is a single-burst message that has been completed via the first time-slot.

16 Claims, 13 Drawing Sheets

(51) Int. Cl.
 *H04L 25/03* (2006.01)
 *H04W 12/10* (2009.01)
 *H04W 74/08* (2009.01)
 *H04B 1/69* (2011.01)

(52) U.S. Cl.
 CPC ....... *H04W 12/10* (2013.01); *H04W 74/0833* (2013.01); *H04W 74/085* (2013.01)

(56) References Cited

U.S. PATENT DOCUMENTS

| | | |
|---|---|---|
| 8,379,662 B2 | 2/2013 | Imamura et al. |
| 2004/0079390 A1* | 4/2004 | Wiley .................... G02B 6/245 134/19 |
| 2008/0141319 A1* | 6/2008 | Jang .................... H04H 20/426 725/105 |
| 2009/0006927 A1* | 1/2009 | Sayadi ................. H04L 1/0041 714/762 |
| 2010/0087142 A1* | 4/2010 | Panpaliya .......... H04B 7/15542 455/15 |
| 2010/0087199 A1* | 4/2010 | Chowdhary ........ H04W 72/005 455/450 |
| 2010/0271971 A1 | 10/2010 | Koo |
| 2011/0117835 A1* | 5/2011 | Bohn .................. H04W 72/005 455/18 |
| 2011/0222476 A1 | 9/2011 | Hole et al. |
| 2012/0051273 A1* | 3/2012 | Febvre .................. H04L 1/0045 370/310 |
| 2015/0289228 A1* | 10/2015 | Sikri ................. H04W 52/0238 370/311 |
| 2017/0171808 A1* | 6/2017 | Bishop, Jr. et al. ................. H04W 53/0203 |

* cited by examiner

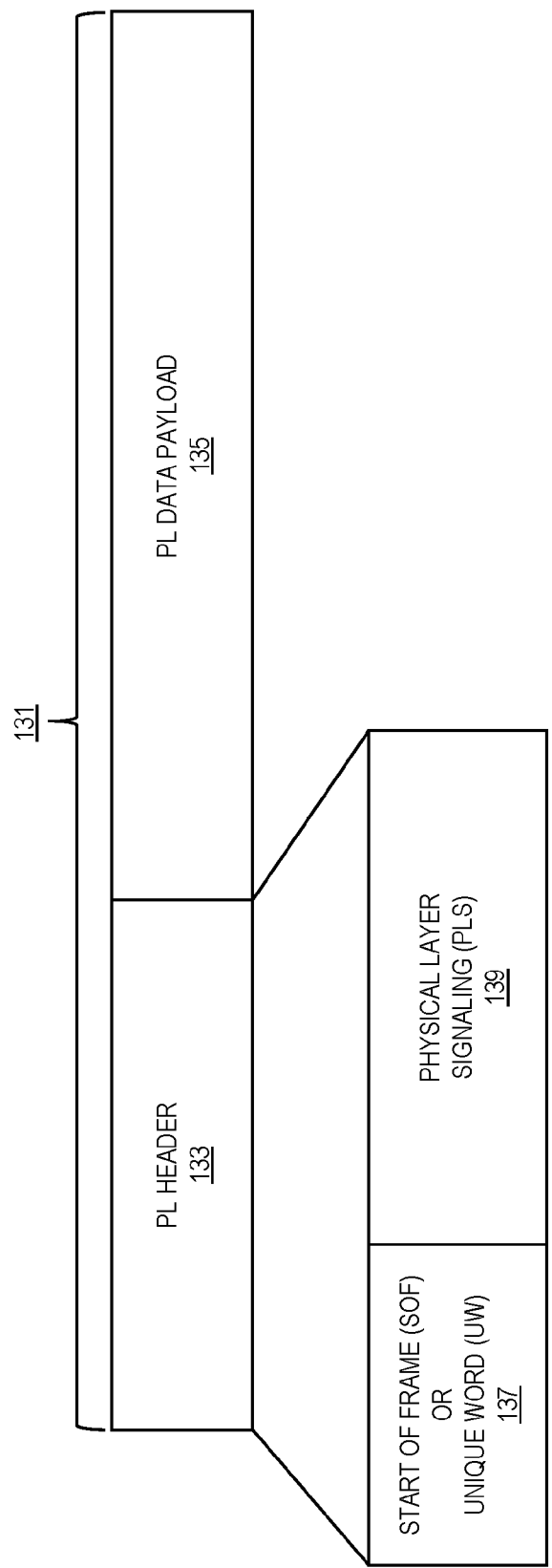

UNIQUE WORD (UW) BASED MULTIPLE ACCESS MESSAGE PROCESSING

RELATED APPLICATIONS

This application claims the benefit of the earlier filing date under 35 U.S.C. § 119(e) from U.S. Provisional Application Ser. No. 62/180,948 (filed 2015 Jun. 17) and U.S. Provisional Application Ser. No. 62/180,957 (filed 2015 Jun. 17), which are incorporated herein by reference herein in their entireties.

BACKGROUND

Multiple access schemes are employed by modern radio systems to allow multiple users to share a limited amount of bandwidth, while maintaining acceptable system performance. Common multiple access schemes include Frequency Division Multiple Access (FDMA), Time Division Multiple Access (TDMA) and Code Division Multiple Access (CDMA). System performance is also aided by error control codes. Nearly all communications systems rely on some form of error control for managing errors that may occur due to noise and other factors during transmission of information through a communication channel. These communications systems can include satellite systems, fiber-optic systems, cellular systems, and radio and television broadcasting systems. Efficient error control schemes implemented at the transmitting end of these communications systems have the capacity to enable the transmission of data including audio, video, text, etc., with very low error rates within a given signal-to-noise ratio (SNR) environment. Powerful error control schemes also enable a communication system to achieve target error performance rates in environments with very low SNR, such as in satellite and other wireless systems where noise is prevalent and high levels of transmission power are costly, if even feasible.

Interleave Division Multiple Access (IDMA) is a multiple access technique where different users that share the same bandwidth and time slots are separated by user specific interleavers. As the bandwidth and power become scarce to support the ever increasing throughput requirements, more complex but more efficient techniques play more important roles in future communication systems. IDMA is an effective technique that trades extra receiver complexity with bandwidth and power savings. On the other hand, in systems where the number of users is high and the block size is large, storage of a high number of long interleavers may be undesirable. Scrambled Coded Multiple Access (SCMA) addresses this complexity by using a single scrambling sequence with different shift factors for different users without any performance penalty. With SCMA, the user specific interleavers of IDMA are replaced with user specific scrambler sequences. While there is no noticeable performance difference between the two approaches, generation and implementation of scrambler sequences is significantly simpler. In fact, the same scrambler sequence with different rotation factors can be used for different users with no impact on performance, which further reduces receiver complexity. With SCMA, therefore, all of the benefits of IDMA are achieved with reduced complexity.

Similar to IDMA or random waveform Code Division Multiple Access (CDMA), SCMA is a non-orthogonal multiple access technique. While orthogonal multiple access schemes such as Time Division Multiple Access (TDMA) or Frequency Division Multiple Access (FDMA) are implicitly too restrictive to achieve theoretical limits in fading channels, non-orthogonal CDMA, IDMA or SCMA have the potential of achieving these limits. Further, as discussed above FEC coding is typically used to improve the performance. The main difference between CDMA and SCMA is that, while in CDMA different users are separated with different signature sequences with a spreading factor greater than one, in SCMA even a spreading factor of one would be enough to detect overlapped users based on user specific scrambler sequences and iterative multiuser cancellation with FEC decoding. As a result, the available bandwidth can be used for very low rate coding which gives SCMA extra coding gain that is not available in CDMA. Actually it is also possible to use SCMA with a spreading factor greater than one. Another benefit of the iterative receiver structure of SCMA is that the system performance actually improves with power variations among the users, which eliminates the need of power control, an important requirement of traditional CDMA.

Further, in conventional burst mode communication systems, a transmitter transmits burst mode signals at a certain frequency, phase and timing, which is received by a receiver through a communication channel. In conventional burst mode communication systems, it is necessary to quickly estimate various parameters of the received bursts as they arrive. These parameters include detection of the presence of a burst (start time), frequency, initial phase, timing and amplitude. In typical burst transmission systems, a unique word is used to facilitate the identification of the beginning of a transmitted burst and the determination of phase offset, by the receiver. The term "Unique Word" (UW) refers to a known, pre-determined pattern (known a priori to the receiver) that is transmitted at the beginning of each burst, whereby the receiver detects the UW and synchronizes with the received bursts (i.e., the receiver estimates the burst parameters based on the detected UW).

At the receiver, iterative multiuser detection or interference cancellation followed by decoding is performed to approach maximum likelihood (ML) receiver performance without excessive complexity. But for coded CDMA systems, even this iterative receiver may lead to complicated algorithms especially when the number of users is large. Typically with CDMA, the complexity of multiuser detection or soft interference cancellation algorithms grows in polynomial form with the number of users/user terminals. On the other hand, similar to IDMA, SCMA lends itself to a simple chip by chip detection algorithm whose total complexity grows only linearly with the number of users. Further, uncoded SCMA systems perform at least as well as and usually better than uncoded CDMA, and the performance gap between the two classes of schemes grows bigger for heavily loaded systems.

Moreover (as discussed in further detail below), in a large-scale shared bandwidth communications system, a number of channels may be designated as random access contention channels for terminals to send short messages. In a TDMA system, such random access contention channels are typically implemented as slotted Aloha (S-Aloha) channels. The terminal in a TDMA based network may use the S-Aloha contention channel for send control messages to a respective gateway to request a dedicated channel for a communications session (e.g., a web browsing session). The terminal then waits for assignment of the dedicated channel before beginning the session data transmissions. With much higher efficiency, however, SCMA can be employed for a contention channel to send short messages directly, without requesting and waiting for assignment of dedicated bandwidth. Moreover, such applications for an SCMA channel are becoming increasingly important for delay sensitive communications that cannot afford the added latency of the dedicated bandwidth request and bandwidth assignment response. Further, a reduction of latency has become more important for web browsing applications for faster response times and improved user experience.

Further, with respect to web browsing sessions, each webpage request transmitted by the client terminal or web browser typically requires more data to be transmitted, as webpages have become more complex (e.g., on average, a typical webpage contains upwards of 30-60 objects). A typical webpage request would require many SCMA bursts to complete.

While the complexity of SCMA grows only linearly with the number of users, however, with larger systems (e.g., having upwards of tens or hundreds of thousands of user terminals), SCMA system implementations can become relatively complex with each user/user terminal having a distinct scrambling signature. Further, with regard to applications that may require several SCMA bursts for a message (e.g., a webpage request message), the receiver complexity compounds the delay in processing such a request. What is needed, therefore, is an approach for an SCMA protocol, where applications may require several SCMA bursts for a message, that facilitates more efficient and streamlined processing at the receiver, and consequently reduces the processing time.

SOME EXAMPLE EMBODIMENTS

Embodiments of the present invention advantageously address the foregoing requirements and needs, as well as others, by providing approaches for SCMA protocol, where applications may require several SCMA bursts for a message, which facilitates more efficient and streamlined processing at the receiver, and consequently reduces the processing time.

In a large-scale shared bandwidth communications system, an SCMA multiple access approach is employed, which facilitates random access to a communications channel by a network of terminals in an efficient manner without prior coordination. Unique words are respectively assigned to individual terminals, and each terminal utilizes its assigned UW for each transmitted burst. At the receiver side, the receiver correlates the received signal bursts against these UWs to determine whether one or more terminals is accessing the channel and the number of terminals accessing the channel (assuming there is at least one), to identify the scrambling signature or initial vector each such terminal is utilizing to access the channel, and to synchronize with (e.g., determine the timing and phase of) each individual received modulated signal for proper demodulation and decoding. Accordingly, a receiver separates overlapping transmissions from multiple terminals at the same frequency and the same time slot, based on a UW correlation process employed to detect the transmitted UWs in parallel and thereby identify the terminals accessing the channel and the scrambling signature/initial vector of each such terminal, and to synchronize with each individual received modulated signal for proper demodulation and decoding. In accordance with example embodiments of the present invention, further approaches are provided within this SCMA scheme to facilitate more efficient processing and thereby reduce the burden and processing load on the receiver with regard to the initial processing performed for detecting and correlating the UWs to determine the transmitting terminals in each time slot. According to one such embodiment, an approach is provided that takes advantage of the fact that most return link request messaging (i.e., the terminal request messaging) transmitted on the SCMA contention channel requires a number of consecutive SCMA bursts. Accordingly, because such consecutive bursts are from the same terminal, each burst will utilize the same UW and associated scrambling signature or initial vector, and will be transmitted at essentially the same frequency and phase. If a UW is detected in a previous SCMA time slot, then the searching/correlation for the particular UW can be accomplished in a more efficient manner for subsequent bursts, which significantly reduces the processing burden of the receiver.

Additionally, the SCMA request message bursts from the terminals generally arrive in a random fashion, and can typically be modeled as Poison arrival with a mean arrival rate. In accordance a further embodiment, therefore, a reasonably sized buffer can be employed at the front end of the receiver to enable the receiver to process the arriving bursts at a reduced rate (e.g., at a rate relatively marginally above the mean arrival rate), instead of at the peak receiving rate, which would facilitate a further processing complexity reduction. Further, the number of interference cancellation iterations required to achieve correct results can be significantly less when fewer bursts are transmitted in an SCMA slot (i.e., due to the associated reduction of interference). Accordingly, the receiver can stop the processing and output the results, and start the next time slot when all the bursts in the time slot are decoded correctly. The front end buffer and early processing termination reduces the iterative interference processing complexity significantly. In accordance with yet a further embodiment, in a network that utilizes multiple SCMA carriers, x number of SCMA receivers can be grouped together with y number of SCMA carriers with a common buffer to take advantage of additional statistical multiplexing between the y carriers for further complexity reduction.

In accordance with example embodiments, a method for communicating over a random access contention channel is provided. A data communications signal is received via a random access channel of a wireless communications network. The data communications signal is processed to search for data bursts in a first time-slot of the random access channel that include any one of a first set of signature sequences assigned to the first time-slot, it is determined that a data burst A in the first time-slot includes a first one of the first set of signature sequences assigned to the first time-slot, and, based on this determination, resolving that the data burst A in the first time-slot is an initial burst of a message from a first communications terminal. The data communications signal is processed to determine whether a second time-slot of the random access channel (directly following the first time-slot) includes a data burst B that includes the first one of the first set of signature sequences assigned to the first time-slot. In a circumstance when it is determined that the second time-slot includes the data burst B (including the first one of the first set of signature sequences assigned to the first time-slot), it is resolved that the message from the first communications terminal is a multi-burst message and that the data burst B is a second burst of the multi-burst message from the first communications terminal. In a circumstance when it is determined that the second time-slot does not include the data burst B (including the first one of the first set of signature sequences assigned to the first time-slot), it is resolved that the message from the first communications terminal is a single-burst message that has been completed via the first time-slot.

According to a further embodiment of the method, in the circumstance when it is determined that the second time-slot includes the data burst B (including the first one of the first set of signature sequences assigned to the first time-slot), the data communications signal is processed to determine whether a third time-slot of the random access channel (directly following the second time-slot) includes a data burst C that includes the first one of the first set of signature sequences assigned to the first time-slot. In a circumstance when it is determined that the third time-slot includes the data burst C (including the first one of the first set of signature sequences assigned to the first time-slot), it is resolved that that the data burst C is a third burst of the multi-burst message from the first communications terminal. In a circumstance when it is determined that the third time-slot does not include the data burst C (including the first one of the first set of signature sequences assigned to the first time-slot), it is resolved that the multi-burst message from the first communications terminal has been completed via the second time-slot.

According to a further embodiment of the method, in the circumstance when it is determined that the third time-slot includes the data burst C (including the first one of the first set of signature sequences assigned to the first time-slot), the data communications signal is processed to determine whether subsequent time-slots of the random access channel respectively include further data bursts that each includes the first one of the first set of signature sequences assigned to the first time-slot. In a circumstance when it is determined that one or more of such subsequent time-slots of the random access channel respectively include such further data bursts (that each includes the first one of the first set of signature sequences assigned to the first time-slot), it is resolved that each of such further data bursts (that each includes the first one of the first set of signature sequences assigned to the first time-slot) is a respective subsequent burst of the multi-burst message from the first communications terminal. In a circumstance when it is determined that a one of such subsequent time-slots of the random access channel does not include any such further data burst (that includes the first one of the first set of signature sequences assigned to the first time-slot), it is resolved that that the multi-burst message from the first communications terminal has been completed via a time-slot directly preceding the one of such subsequent time-slots of the random access channel that does not include any such further data burst (that includes the first one of the first set of signature sequences assigned to the first time-slot).

According to a further embodiment of the method, it is determined that a data burst AA in the first time-slot includes a second one of the first set of signature sequences assigned to the first time-slot, and, based on this determination, resolving that the data burst AA in the first time-slot is an initial burst of a message from a second communications terminal. The data communications signal is processed to determine whether the second time-slot of the random access channel includes a data burst BB that includes the second one of the first set of signature sequences assigned to the first time-slot. In a circumstance when it is determined that the second time-slot includes the data burst BB (including the second one of the first set of signature sequences assigned to the first time-slot), it is resolved that the message from the second communications terminal is a multi-burst message and that the data burst BB is a second burst of the multi-burst message from the second communications terminal. In a circumstance when it is determined that the second time-slot does not include the data burst BB (including the first one of the first set of signature sequences assigned to the first time-slot), it is resolved that that the message from the second communications terminal is a single-burst message that has been completed via the first time-slot.

According to a further embodiment of the method, the data communications signal is processed to search for data bursts in a future time-slot of the random access channel that include any one of a further set of signature sequences assigned to the future time-slot, and determining that a data burst AAA in the future time-slot includes a first one of the further set of signature sequences assigned to the future time-slot, and, based on this determination, resolving that the data burst AAA in the future time-slot is an initial burst of a message from a further communications terminal.

According to a further embodiment of the method, the data communications signal is processed to determine whether a first subsequent time-slot of the random access channel directly following the future time-slot includes a data burst BBB that includes the first one of the further set of signature sequences assigned to the future time-slot. In a circumstance when it is determined that the first subsequent time-slot of the random access channel includes the data burst BBB (including the first one of the further set of signature sequences assigned to the future time-slot), it is resolved that the message from the further communications terminal is a multi-burst message and that the data burst BBB is a second burst of the multi-burst message from the further communications terminal. In a circumstance when it is determined that the first subsequent time-slot of the random access channel does not include the data burst BBB (including the first one of the further set of signature sequences assigned to the future time-slot), it is resolved that the message from the further communications terminal is a single-burst message that has been completed via the future time-slot.

According to a further embodiment of the method, in the circumstance when it is determined that the first subsequent time-slot of the random access channel directly following the future time-slot includes the data burst BBB (including the first one of the further set of signature sequences assigned to the future time-slot), the data communications signal is processed to determine whether a second subsequent time-slot of the random access channel directly following the first subsequent time-slot includes a data burst CCC that includes the first one of the first set of signature sequences assigned to the future time-slot. In a circumstance when it is determined that the second subsequent time-slot of the random access channel includes the data burst CCC (including the first one of the first set of signature sequences assigned to the future time-slot), it is resolved that the data burst CCC is a third burst of the multi-burst message from the further communications terminal. In a circumstance when it is determined that the second subsequent time-slot of the random access channel does not include the data burst CCC (including the first one of the first set of signature sequences assigned to the future time-slot), it is resolved that the multi-burst message from the further communications terminal has been completed via the first subsequent time-slot.

According to a further embodiment of the method, in the circumstance when it is determined that the second subsequent time-slot of the random access channel includes the data burst CCC (including the first one of the first set of signature sequences assigned to the future time-slot), the data communications signal is processed to determine whether further subsequent time-slots of the random access channel respectively include further data bursts that each includes the first one of the further set of signature sequences assigned to the future time-slot. In a circumstance when it is determined that one or more of such further subsequent time-slots of the random access channel respectively include such further data bursts (that each includes the first one of the further set of signature sequences assigned to the future time-slot), it is resolved that each of such further data bursts (that each includes the first one of the first set of signature sequences assigned to the future time-slot) is a respective subsequent burst of the multi-burst message from the further communications terminal. In a circumstance when it is determined that a one of such further subsequent time-slots of the random access channel does not include any such further data burst (that includes the first one of the first set of signature sequences assigned to the future time-slot), it is resolved that the multi-burst message from the further communications terminal has been completed via a time-slot directly preceding the one of such further subsequent time-slots of the random access channel that does not include any such further data burst (that includes the first one of the first set of signature sequences assigned to the future time-slot).

In accordance with example embodiments, s communications terminal comprises a receiver and a processor. The receiver is configured to receive a data communications signal via a random access channel of a wireless communications network. The processor is configured to process the data communications signal to search for data bursts in a first time-slot of the random access channel that include any one of a first set of signature sequences assigned to the first time-slot. In a circumstance when the processor determines that a data burst A in the first time-slot includes a first one of the first set of signature sequences assigned to the first time-slot, the processor is configured to resolve that the data burst A in the first time-slot is an initial burst of a message from a first communications terminal. The processor is further configured to process the data communications signal to determine whether a second time-slot of the random access channel (directly following the first time-slot) includes a data burst B that includes the first one of the first set of signature sequences assigned to the first time-slot. In a circumstance when the processor determines that the second time-slot includes the data burst B (including the first one of the first set of signature sequences assigned to the first time-slot), the processor is configured to resolve that the message from the first communications terminal is a multi-burst message and that the data burst B is a second burst of the multi-burst message from the first communications terminal. In a circumstance when the processor determines that the second time-slot does not include the data burst B (including the first one of the first set of signature sequences assigned to the first time-slot), the processor is configured to resolve that the message from the first communications terminal is a single-burst message that has been completed via the first time-slot.

According to a further embodiment of the communications terminal, in the circumstance when the processor determines that the second time-slot includes the data burst B (including the first one of the first set of signature sequences assigned to the first time-slot), the processor is further configured to process the data communications signal to determine whether a third time-slot of the random access channel (directly following the second time-slot) includes a data burst C that includes the first one of the first set of signature sequences assigned to the first time-slot. In a circumstance when the processor determines that the third time-slot includes the data burst C (including the first one of the first set of signature sequences assigned to the first time-slot), the processor is configured to resolve that the data burst C is a third burst of the multi-burst message from the first communications terminal. In a circumstance when the processor determines that the third time-slot does not include the data burst C (including the first one of the first set of signature sequences assigned to the first time-slot), the processor is configured to resolve that the multi-burst message from the first communications terminal has been completed via the second time-slot.

According to a further embodiment of the communications terminal, in the circumstance when the processor determines that the third time-slot includes the data burst C (including the first one of the first set of signature sequences assigned to the first time-slot), the processor is further configured to process the data communications signal to determine whether subsequent time-slots of the random access channel respectively include further data bursts that each includes the first one of the first set of signature sequences assigned to the first time-slot. In a circumstance when the processor determines that one or more of such subsequent time-slots of the random access channel respectively include such further data bursts (that each includes the first one of the first set of signature sequences assigned to the first time-slot), the processor is configured to resolve that each of such one or more subsequent time-slots of the random access channel is a respective subsequent burst of the multi-burst message from the first communications terminal. In a circumstance when the processor determines that a one of such subsequent time-slots of the random access channel does not include any such further data burst (that includes the first one of the first set of signature sequences assigned to the first time-slot), the processor is configured to resolve that the multi-burst message from the first communications terminal has been completed via a time-slot directly preceding the one of such subsequent time-slots of the random access channel that does not include any such further data burst (that includes the first one of the first set of signature sequences assigned to the first time-slot).

According to a further embodiment of the communications terminal, in a circumstance when the processor determines that a data burst AA in the first time-slot includes a second one of the first set of signature sequences assigned to the first time-slot, the processor is configured to resolve that the data burst AA in the first time-slot is an initial burst of a message from a second communications terminal, and to process the data communications signal to determine whether the second time-slot of the random access channel includes a data burst BB that includes the second one of the first set of signature sequences assigned to the first time-slot. In a circumstance when the processor determines that the second time-slot includes the data burst BB (including the second one of the first set of signature sequences assigned to the first time-slot), the processor is configured to resolve that the message from the second communications terminal is a multi-burst message and that the data burst BB is a second burst of the multi-burst message from the second communications terminal. In a circumstance when the processor determines that the second time-slot does not include the data burst BB (including the first one of the first set of signature sequences assigned to the first time-slot), the processor is configured to resolve that the message from the second communications terminal is a single-burst message that has been completed via the first time-slot.

According to a further embodiment of the communications terminal, the processor is further configured to process the data communications signal to search for data bursts in a future time-slot of the random access channel that include any one of a further set of signature sequences assigned to the future time-slot, wherein, in a circumstance when the processor determines that a data burst AAA in the future time-slot includes a first one of the further set of signature sequences assigned to the future time-slot, the processor is configured to resolve that the data burst AAA in the future time-slot is an initial burst of a message from a further communications terminal.

According to a further embodiment of the communications terminal, the processor is further configured to process the data communications signal to determine whether a first subsequent time-slot of the random access channel directly following the future time-slot includes a data burst BBB that includes the first one of the further set of signature sequences assigned to the future time-slot. In a circumstance when the processor determines that the first subsequent time-slot of the random access channel includes the data burst BBB (including the first one of the further set of signature sequences assigned to the future time-slot), the processor is configured to resolve that the message from the further communications terminal is a multi-burst message and that the data burst BBB is a second burst of the multi-burst message from the further communications terminal. In a circumstance when the processor determines that the first subsequent time-slot of the random access channel does not include the data burst BBB (including the first one of the further set of signature sequences assigned to the future time-slot), the processor is configured to resolve that the message from the further communications terminal is a single-burst message that has been completed via the future time-slot.

According to a further embodiment of the communications terminal, in the circumstance when the processor determines that the first subsequent time-slot of the random access channel directly following the future time-slot includes the data burst BBB (including the first one of the further set of signature sequences assigned to the future time-slot), the processor is further configured to process the data communications signal to determine whether a second subsequent time-slot of the random access channel directly following the first subsequent time-slot includes a data burst CCC that includes the first one of the first set of signature sequences assigned to the future time-slot. In a circumstance when the processor determines that the second subsequent time-slot of the random access channel includes the data burst CCC (including the first one of the first set of signature sequences assigned to the future time-slot), the processor is configured to resolve that the data burst CCC is a third burst of the multi-burst message from the further communications terminal. In a circumstance when the processor determines that the second subsequent time-slot of the random access channel does not include the data burst CCC (including the first one of the first set of signature sequences assigned to the future time-slot), the processor is configured to resolve that the multi-burst message from the further communications terminal has been completed via the first subsequent time-slot.

According to a further embodiment of the communications terminal, in the circumstance when the processor determines that the second subsequent time-slot of the random access channel includes the data burst CCC (including the first one of the first set of signature sequences assigned to the future time-slot), the processor is further configured to process the data communications signal to determine whether further subsequent time-slots of the random access channel respectively include further data bursts that each includes the first one of the further set of signature sequences assigned to the future time-slot. In a circumstance when the processor determines that one or more of such further subsequent time-slots of the random access channel respectively include such further data bursts (that each includes the first one of the further set of signature sequences assigned to the future time-slot), the processor is configured to resolve that each of such further data bursts (that each includes the first one of the first set of signature sequences assigned to the future time-slot) is a respective subsequent burst of the multi-burst message from the further communications terminal. In a circumstance when the processor determines that a one of such further subsequent time-slots of the random access channel does not include any such further data burst (that includes the first one of the first set of signature sequences assigned to the future time-slot), the processor is configured to resolve that the multi-burst message from the further communications terminal has been completed via a time-slot directly preceding the one of such further subsequent time-slots of the random access channel that does not include any such further data burst (that includes the first one of the first set of signature sequences assigned to the future time-slot).

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements, and in which:

FIG. 1E illustrates, for example, the frame format of a physical layer frame, for example, in accordance with the DVB S2 framing structure, channel coding and modulation systems standard;

DETAILED DESCRIPTION

Figure 1A:
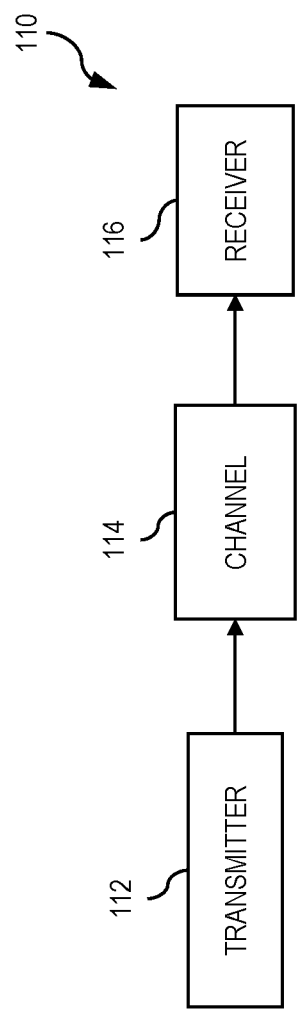
FIGS. 1A and 1B illustrate communications systems capable of employing approaches in accordance with example embodiments of the present invention.

Approaches for a scrambled coded multiple access SCMA protocol, where applications may require several SCMA bursts for a message, which facilitates more efficient and streamlined processing at the receiver, and consequently reduces the processing time, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Figure 1B:
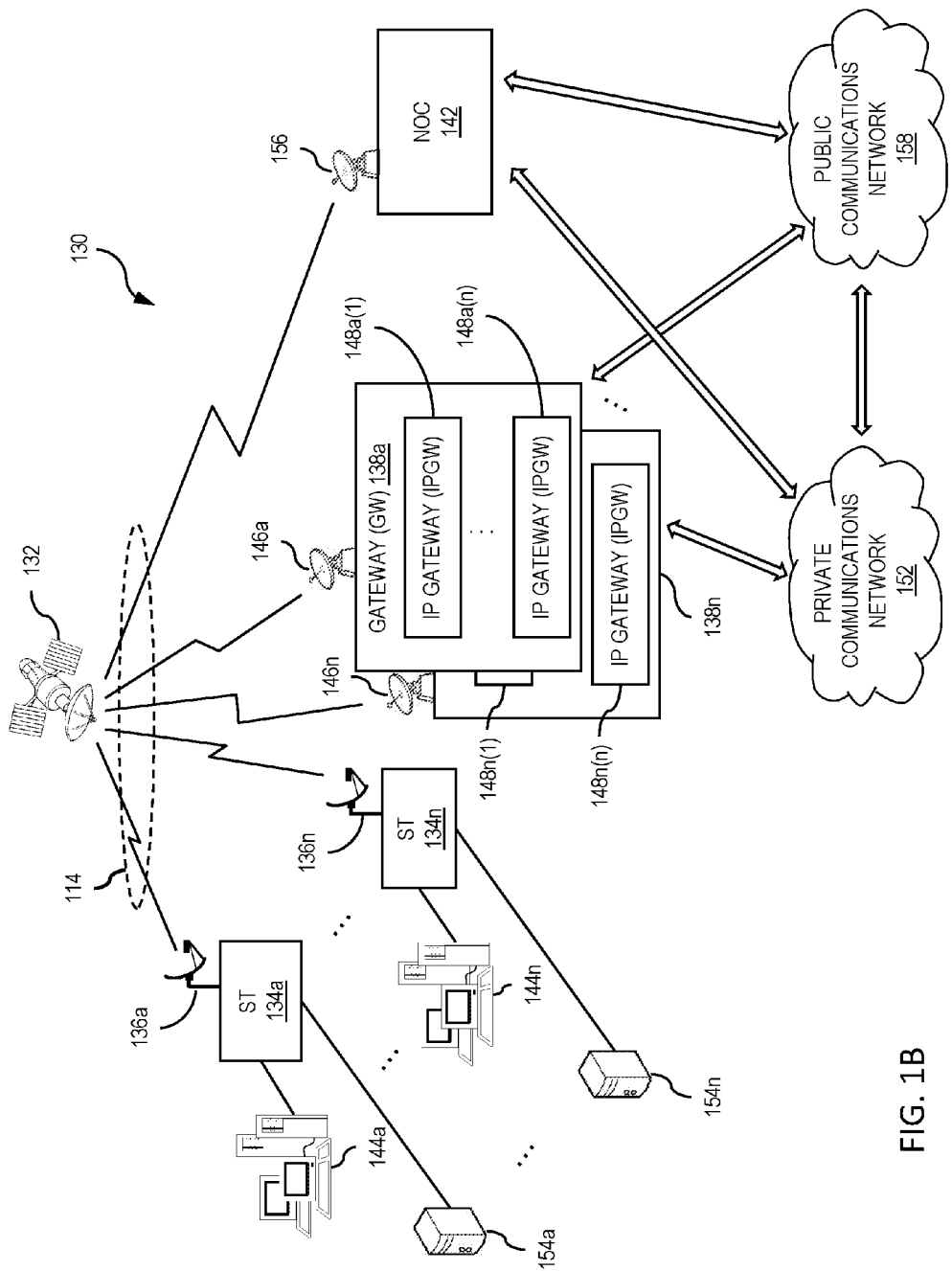
Figure 1C:
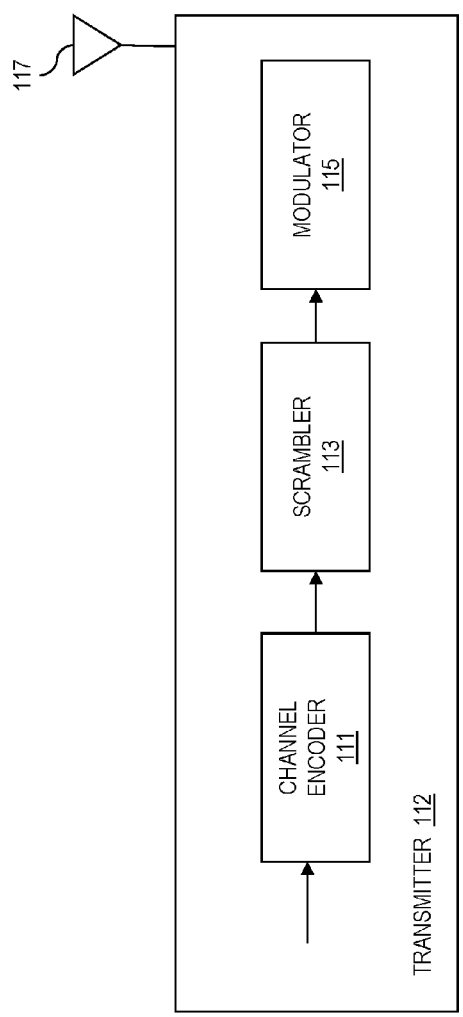
FIG. 1C illustrates a block diagram depicting a transmitter configured to operate in the systems of FIGS. 1A and 1B, in accordance with example embodiments of the present invention.

FIGS. 1A, 1B, 1C illustrate communications systems capable of employing approaches according to various example embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction code) to combat noise and other issues associated with the channel 114. Once encoded, the encoded signals may then be modulated onto a carrier for transmission over the channel 114. The signal waveforms are attenuated, or otherwise altered, by communications channel 114.

FIG. 1B illustrates an example satellite communications system 130 capable of supporting communications among terminals with varied capabilities, according to example embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 130. For example, the NOC 142 performs such functions as network management and configuration, software downloads (e.g., to the STs 134a-

134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IP-GWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Accordingly, an inroute manager or inroute group manager (IGM) (not shown) may be located at each of the gateways. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 142, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an example embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

FIG. 1C illustrates a block diagram depicting a transmitter configured to operate in the systems of FIGS. 1A and 1B, in accordance with example embodiments of the present invention. With reference to FIG. 1C, a transmitter 112 is equipped with a channel encoder (e.g., a turbo encoder or low density parity check code (LDPC) encoder) 111 that accepts input from an information source and outputs coded stream of higher redundancy suitable for error correction processing at the receiver. The information source generates k signals from a discrete alphabet X. The channel encoder 111 may utilize a combination of a constituent encoder that uses one or more constituent codes and an interleaver (not shown) to implement the channel coding procedure. For example, turbo codes are produced by parallel concatenation of two codes (e.g., convolutional codes) with an interleaver in between the encoders. A low-density parity-check (LDPC) code is a linear error correcting code, constructed using a sparse bipartite graph. Any linear code has a bipartite graph and a parity-check matrix representation, but not all linear codes have a sparse representation. An n×m matrix is sparse if the number of 1's in any row (the row weight $w_r$) and the number of 1's in any column (the column weight $w_c$) is much less than the respective dimension (i.e., $w_r<<m$, $w_c<<n$). A code represented by a sparse parity-check matrix is called a low density parity check (LDPC) code. Essentially, the encoder 111 generates the encoded signals/symbols from alphabet Y, and the channel scrambler 113 scrambles the alphabet (e.g., the channel scrambler pseudo-randomizes the code symbols). The scrambled signals are fed to a modulator 115, which maps the encoded messages from encoder 111 to signal waveforms that are forwarded to a transmit antenna 117. The antenna 117 emits these waveforms over the communication channel 114. The transmissions from the transmit antenna then propagate to a receiver, as discussed below.

Figure 1D:
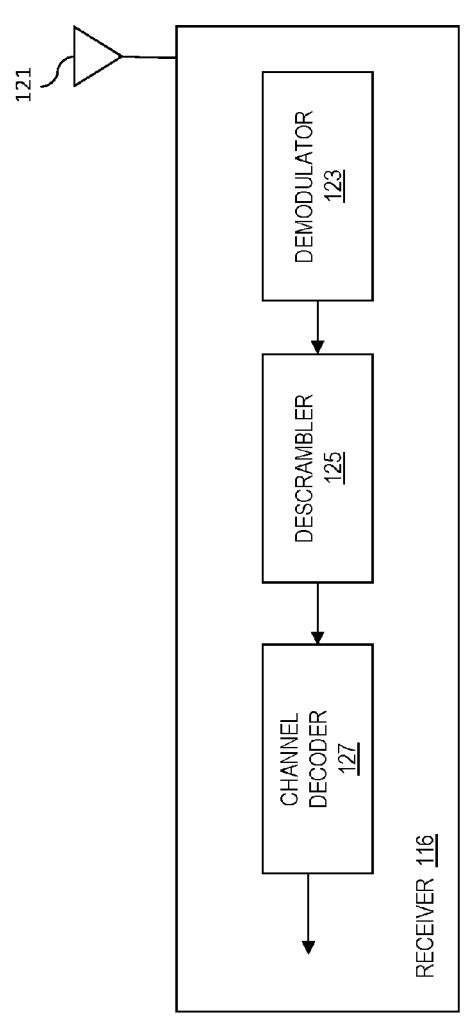
FIG. 1D illustrates a block diagram depicting a receiver configured to operate in the systems of FIGS. 1A and 1B, in accordance with example embodiments of the present invention.

FIG. 1D illustrates a block diagram depicting a receiver configured to operate in the systems of FIGS. 1A and 1B, in accordance with example embodiments of the present invention. At the receiving side, a receiver 116 includes an antenna 121 that receives the waveforms emitted over the channel 114 by the transmitter 112. The receiver 116 provides a demodulator 123 that performs demodulation of the received signals. After demodulation, the received signals are forwarded to a channel de-scrambler 125, which unscrambles the demodulated symbols. A decoder 127 then attempts to reconstruct the original source messages.

It is contemplated that the above transmitter 112 and receiver 116 can be deployed in within a single wireless terminal, in which case a common antenna system can be shared. The wireless terminal can for example be configured to operate within a satellite communication, a cellular system, wireless local area network (WLAN), etc.

Figure 2A:
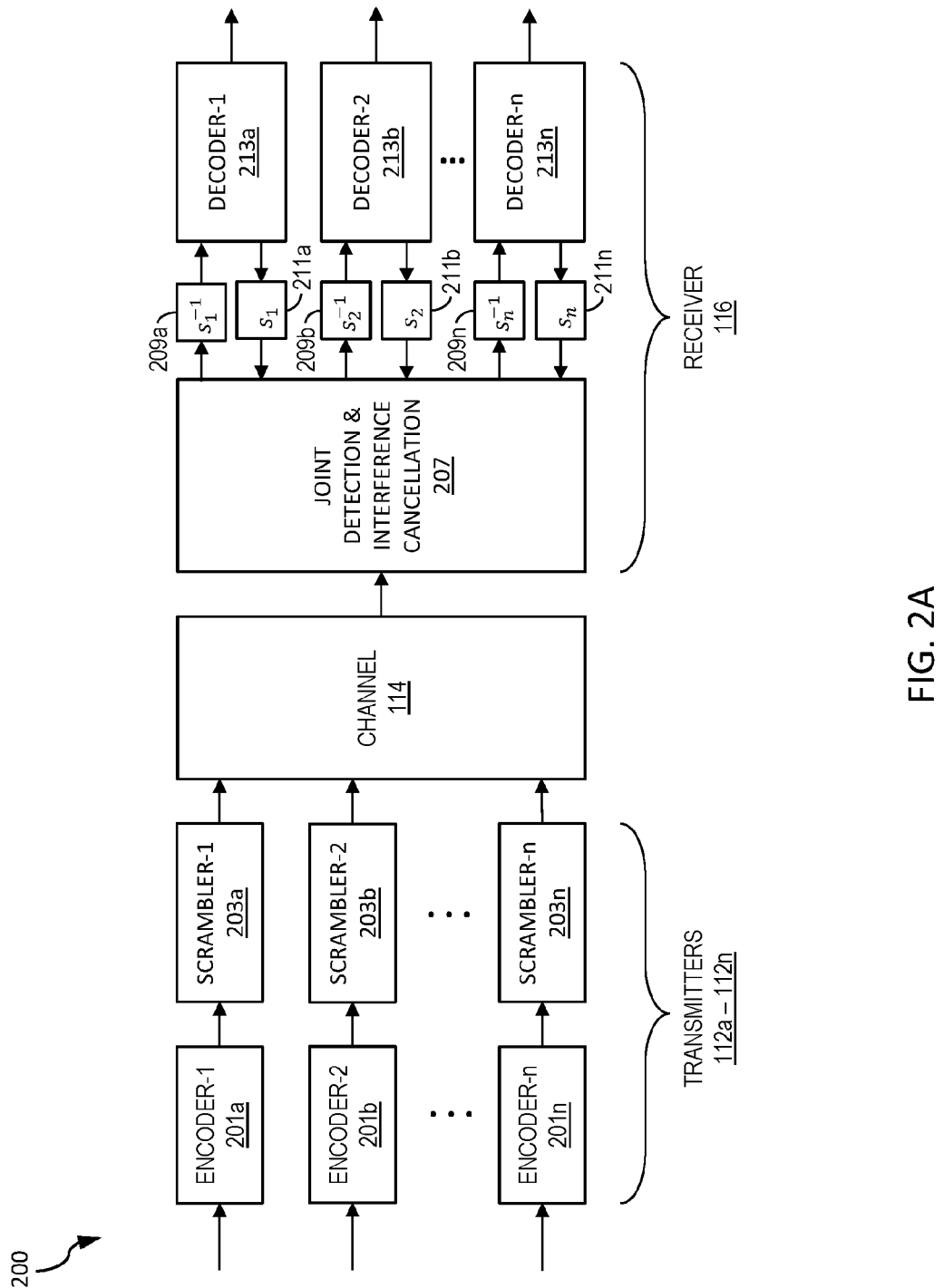
FIG. 2A illustrates a block diagram depicting a system with multiple transmitters using an SCMA scheme, in accordance with example embodiments of the present invention.
Figure 2B:
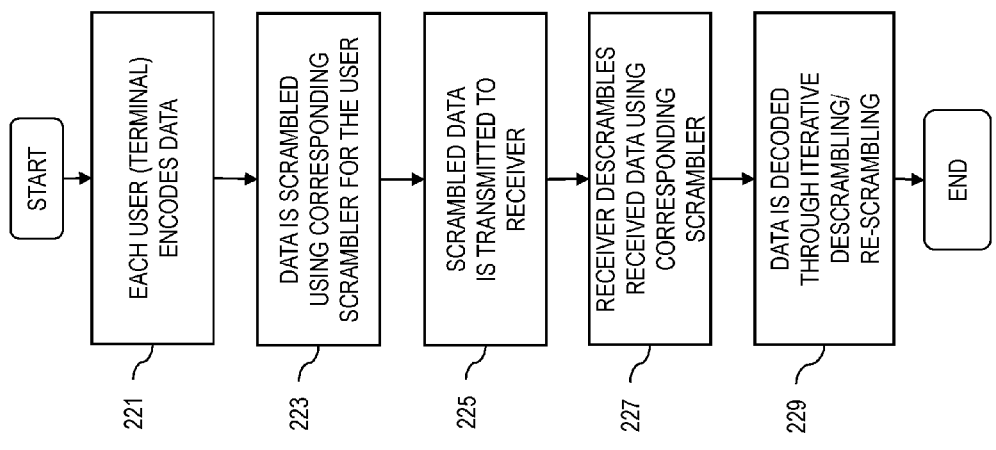
FIG. 2B illustrates a flow chart depicting a scrambling process of the system of FIG. 2A, in accordance with example embodiments of the present invention.

FIG. 2A illustrates a block diagram depicting a system with multiple transmitters using an SCMA scheme, in accordance with example embodiments of the present invention, and FIG. 2B illustrates a flow chart depicting a scrambling process of the system of FIG. 2A, in accordance with example embodiments of the present invention. For the purposes of illustration, a communication system 200 supports multiple transmission terminals (i.e., users) 112a-112n, each configured with a respective encoder 201a-201n and scrambler 203a-203n.

In accordance with example embodiments, the system 200 provides an SCMA multiple access scheme, which achieves good performance with relatively lower receiver complexity compared to CDMA (as the number of users that share the same channel increases). With SCMA, each user sharing the transmission channel is separated by user specific scrambling sequence or initial vector utilized by the respective scramblers 203a-203n. According to one embodiment, by using low rate codes (e.g., low rate turbo codes or low rate LDPC codes), the system 200 achieves greater power efficiency while spreading the spectrum, whereas conventional CDMA does not. By way of example, each of the encoders 201a-201n utilizes the same error correction codes. The encoded sequences are then fed to the respective user/terminal-specific scramblers 203a-203n. The scrambled sequences are then transmitted over the channel 114 to a receiver 116. Additionally, SCMA is different from the IDMA multiple access technique, which also spreads with low-rate turbo-Hadamard codes but uses random interleavers to provide for the distinct user signatures. With such implementations of SCMA, the low-rate decoders are much more straightforward to implement, and all users can utilize the same scrambler hardware, each using a distinct initial vector or seed to provide a distinct terminal scrambling signature. Further, using scrambling sequences as signatures is simpler than random interleaver-based signatures.

By way of example, each terminal encodes its data with, for example, a rate 1/n FEC code, where n is an integer larger than 3. The coded bits are then scrambled with a unique scrambling sequence and transmitted. The number of unique sequences are virtually unlimited with common sequence generators, such as the Gold sequences. Alternatively, the same generator can generate all the sequences, which are differentiated for each terminal by use of a distinct initial vector or seed. Further, other low rates m/n can be utilized (e.g., less than 1/3). By way of further example, the scrambling sequence can be generated by selecting a pseudorandom number sequence (e.g., a Gold sequence) whose period is greater than the code block. On the receiver side, the receiving terminal utilizes the corresponding de-scrambler and a rate 1/n decoder to retrieve the data. The signals are modulated by the same type of modulation, e.g., QPSK, of the same bandwidth, centered at the same frequency and transmitted at the same time (e.g., similar to CDMA). Further, for receivers located in a hub of a star-shaped network, the antennas can be shared. As mentioned, use of scramblers (as opposed to interleavers) reduces complexity. In a large system with numerous users, it is difficult to deploy a large number of interleavers that are prearranged between each pair of sender and receiver, whereas a common scrambler with different initial vector (also known as "seed") can be used for each pair of sender and receiver. Such arrangement is substantially easier to implement.

According to a further embodiment, the receiver includes a joint detector/interference canceller unit 207 that interacts with the decoders 213a-213n to iteratively produce an estimate of the received codewords. With each iteration, the decoder 213a-213n produces a better estimate to the joint detector/interference canceller 207 for achieving better cancellation. The information exchanged between the decoders 213a-213n and the joint detector/interference canceller 207 is scrambled or descrambled via scramblers 209a-209n or de-scramblers 211a-211n, respectively. Once "good" estimates of the decoded sequences are produced, they are output from the decoders 213a-213n. Unlike conventional CDMA systems, the joint-detection/interference canceller 207 does not require all the signals accessing the same spectrum at the same time to be of equal power. In fact, the performance is better when the signals are of different power level. Thus, no tight power controls are needed. Also due to joint-detection/interference cancellation, the system 200 provides a scheme that is much more robust against Rician fading, which makes it particularly more attractive for small mobile terminals experiencing Rician multipath fading.

With reference to FIG. 2B, in accordance with example embodiments, the SCMA system 200 may operate as follows. In step 221, each terminal encodes data using the corresponding encoder (e.g., the respective encoders 201a-201n). Each terminal then scrambles the encoded data via the respective scrambler (e.g., the respective scrambler 203a-203n), and transmits the encoded and scrambled data over the channel 114 to the receiver 116, per steps 223 and 225. At the receiver 116, the received signal is processed by the joint detector/interference canceller 207, and then undergoes an iterative descrambling and re-scrambling process, per step 227. The descrambling and re-scrambling is performed in conjunction with the decoding process, which outputs decoded data (step 229).

In accordance with such example embodiments, as an SCMA system using low-rate FEC coding, the system 200 requires less power to transmit data at the same speed vis-à-vis a CDMA system. In one embodiment, the system 200 can be operated in a random access manner and does not require reservation of time slots, which minimize the delay to one satellite round trip. Additionally, as mentioned above, the system 200 does not require tight power control, minimizing the coordination needed between transmitters 112 and the receiver 116.

Further, in a time division multiple access system (TDMA), for example, several communications terminals may share the same communications channel (e.g., of a common frequency). In the TDMA system the signal transmitted over the channel is segregated into different time slots, where each communications terminal transmits using its own time slot. This allows multiple stations to share the same transmission medium (e.g. radio frequency channel) while using only a part of its channel capacity. At the physical layer the data is configured in the form of data frames. FIG. 1E illustrates, for example, the frame format of a physical layer frame 131, for example, in accordance with the DVB S2 framing structure, channel coding and modulation systems standard. Each frame 131 generally comprises a header 133 and a data payload 132. The header is appended to the data payload for such purposes as, for example, synchronization, demodulation and decoding at the receiver. The data payload comprises the encoded (and, in the case of SCMA, scrambled) source data sequence. The header includes a start of frame (SOF) or unique word (UW)

segment 137, and a physical layer signaling field 139. The PLS field reflects certain modes regarding, for example, the modulation and encoding schemes applied to the data. The UW provides a mechanism for the receiver (e.g., receiver 116) to synchronize on the frame boundaries, and accordingly locate the data payload within each frame. The data payload includes the data and information intended to be received and processed by the destination receiver. By way of example, the receiver receives the transmitted signal, which comprises a series of physical layer data frames. Further, the receiver possesses a priori knowledge of the UW sequence(s) utilized by the respective transmitting terminal(s). The receiver can then search for the respective UW(s) by performing a correlation operation. Once a threshold has been met for the correlation operation, the receiver determines a starting time for the first symbol of the respective UW. Based on the determined starting time for the initial UW symbol, the receiver has thus also determined the initial time of reception or start of the respective physical layer data frame. The receiver can then synchronize and process the symbols of the respective data payload based on the determined initial time of reception or start of the respective physical layer data frame.

In a large-scale shared bandwidth communications system, a number of channels may be designated as random access contention channels for terminals to send short messages, such as control messages—i.e., for establishing a particular data communication session or for providing bandwidth requests to a resource allocation manager located at a respective Gateway. Such a random access contention channel may be implemented as a slotted Aloha (S-Aloha) channel. Aloha is a communications networking protocol, which can be implemented in two different versions or protocols depending on whether or not global synchronization is required. Pure Aloha does not require global synchronization. The basic idea of Pure Aloha is that a terminal is permitted to transmit data on the channel whenever the terminal has data to send. The transmitting terminal monitors feedback and is thereby able to detect when its transmitted data collides with data transmitted by another terminal in the same time slot. If a collision is detected, the transmitting terminal will wait a random or predetermined period of time and then attempt the transmission again. The waiting period of each terminal is randomized so that the same transmissions are not delayed the same amount of time and thus the same collision does not occur repeatedly. By contrast, Slotted Aloha or S-Aloha requires global time synchronization. Based on the synchronization, the S-ALOHA protocol divides time into discrete intervals and each interval corresponds to a time slot for transmission of a frame of data (where all terminals are synchronized with respect to the slot boundaries). By contrast to Pure Aloha, the S-Aloha protocol does not permit a terminal to transmit any time, but instead requires the terminal to wait for the beginning if the next slot for transmission. When a terminal has data to send, therefore, it must wait for the beginning of the next time slot before transmitting the data. With the S-Aloha protocol, while collisions can still occur, the frequency of collisions is reduced based on the transmission occurring only at the beginning of a time slot.

The main difference between SCMA and S-Aloha is that the SCMA scheme permits multiple terminals to transmit data in the same time slot (where the transmitted data of each terminal is distinguished based on a distinct scrambling signature), whereas the S-Aloha scheme only permits data of a single terminal to be transmitted in a respective time slot (otherwise a collision occurs in the data cannot be correctly received by a receiver). More specifically, according to one embodiment, where a common scrambler is used in an SCMA scheme, the data transmitted by each terminal is scrambled by different segments of a pseudo-random number sequence of that same scrambler, where each segment is generated based on a distinct initial vector (or seed). The scrambling of the encoded data by each terminal based on a distinct initial vector results in a distinct signature whereby the data transmitted by the multiple terminals in a common time slot can be distinguished based on that signature.

In a large-scale system, however, where the number of terminals reaches relatively large numbers (e.g., tens or even hundreds of thousands of terminals), traditional SCMA schemes may become impractical, or even relatively impossible. For example, in such a traditional SCMA system with a relatively large number of terminals, when multiple terminals transmit in a single time slot, the receiver will have no way of knowing which terminals are transmitting in that timeslot. The receiver may synchronize on a unique word signifying that data has been transmitted within a respective time slot, but would then have to cycle through or search all of the possible scrambling signatures or scrambling signature initial vectors to determine which terminals have transmitted the data. Accordingly, with such large numbers of terminals, such decoding would become very complex and time-consuming, and would thereby be impractical for such a system.

In accordance with example embodiments, therefore, an approach is provided that enables the scaling of traditional SCMA schemes for such large-scale systems. According to one such embodiment, a unique word (UW) of sufficient length is associated with each of the scrambling signatures or initial vectors, where each terminal is assigned a UW and associated scrambling signature or initial vector. When transmitting data, each terminal scrambles the encoded data symbols using the assigned scrambling signature or initial vector and appends the respective UW as part of the header of each transmitted packet. On the receiver end, by detecting the presence of one or more UWs within a respective time slot, the receiver determines that one or more respective messages or data bursts have been transmitted within that timeslot, where each such data burst has been scrambled based on the scrambling signature or initial vector associated with the respective UW. Then, the receiver can proceed with the processing of each of the received data bursts based on the respective scrambling signature or initial vector associated with the UW of that data burst.

With regard to the implementation of the SCMA protocol, embodiments of the present invention can be applied to either the scenario where each terminal utilizes a unique scrambling signature or sequence for scrambling the encoded symbols of the data transmitted by the terminal, or the scenario where each terminal uses the same scrambling signature with a unique initial vector or seed for scrambling the encoded symbols of the data transmitted by the terminal. In the case of each terminal utilizing a unique scrambling signature, each UW assigned according to example embodiments is associated with a respective scrambling signature, and, in the case of each terminal utilizing the same scrambling signature with a unique initial vector, each UW assigned according to example embodiments is associated with a respective initial vector. Accordingly, while the embodiments of following description is in the context of the SCMA scenario where each terminal utilizes a common scrambling signature with a unique initial vector, one of skill in the art will recognize that such embodiments may also be applied to the SCMA scenario where each terminal utilizes a unique scrambling signature.

With this embodiment, each terminal is assigned a distinct UW and associated initial scrambling vector, each user may be given a separate UW, so the terminal can be uniquely identified based on identification of its UW and the respective unique initial vector can be used for decoding/descrambling its messages. As a large-scale shared bandwidth satellite network or satellite beam potentially has many thousands of users, assignment of a distinct UW to each such terminal would be impractical in terms of the UW correlation process required at the receiver. More specifically, in practice, while only a handful of the terminals may have data to transmit at any given time, at the beginning of each burst or time slot, the receiver would still have to search or correlate based on all of the UWs of the terminals (including the majority of terminals that have not transmitted any data at that given time). Accordingly, such receivers would require extremely complex processing at the front end, which would be impractical and costly to implement.

In accordance with further example embodiments, therefore, SCMA approaches are provided that take advantage of the fact that, in practice, only a relatively small number of terminals will require access to the random access contention channel at the same time. According to one such embodiment, a relatively small number of UWs are assigned to a respective number of terminal groups. The universe of deployed terminals are grouped among the terminal groups, and each terminal of a terminal group is assigned the UW and associated initial scrambling vector or signature for that group. Accordingly, because only a relatively small number of terminals may be accessing the contention channel at the same time slot, the probability of two or more users using the same UW within that slot relatively low. By way of example, a few hundred terminal groups and respective UW's can be employed to divide a universe of many thousands of terminals (e.g., tens or even hundreds of thousands) by a factor that reduces the probability of burst collisions within a time slot down to a level of minimal impact to system performance.

Within the context of such example embodiments, an SCMA receiver correlates the multiple UWs against the received signal to determine whether one or more terminals has transmitted data over the channel, and (if so) the number of terminals accessing the channel in each time slot, to determine the scrambling sequence or initial vector that each such terminal is using to scramble its data as part of the SCMA protocol, and to determine the timing and phase of the respective modulated signals of each such terminal in order to facilitate demodulation and decoding of the respective data bursts.

Figure 3:
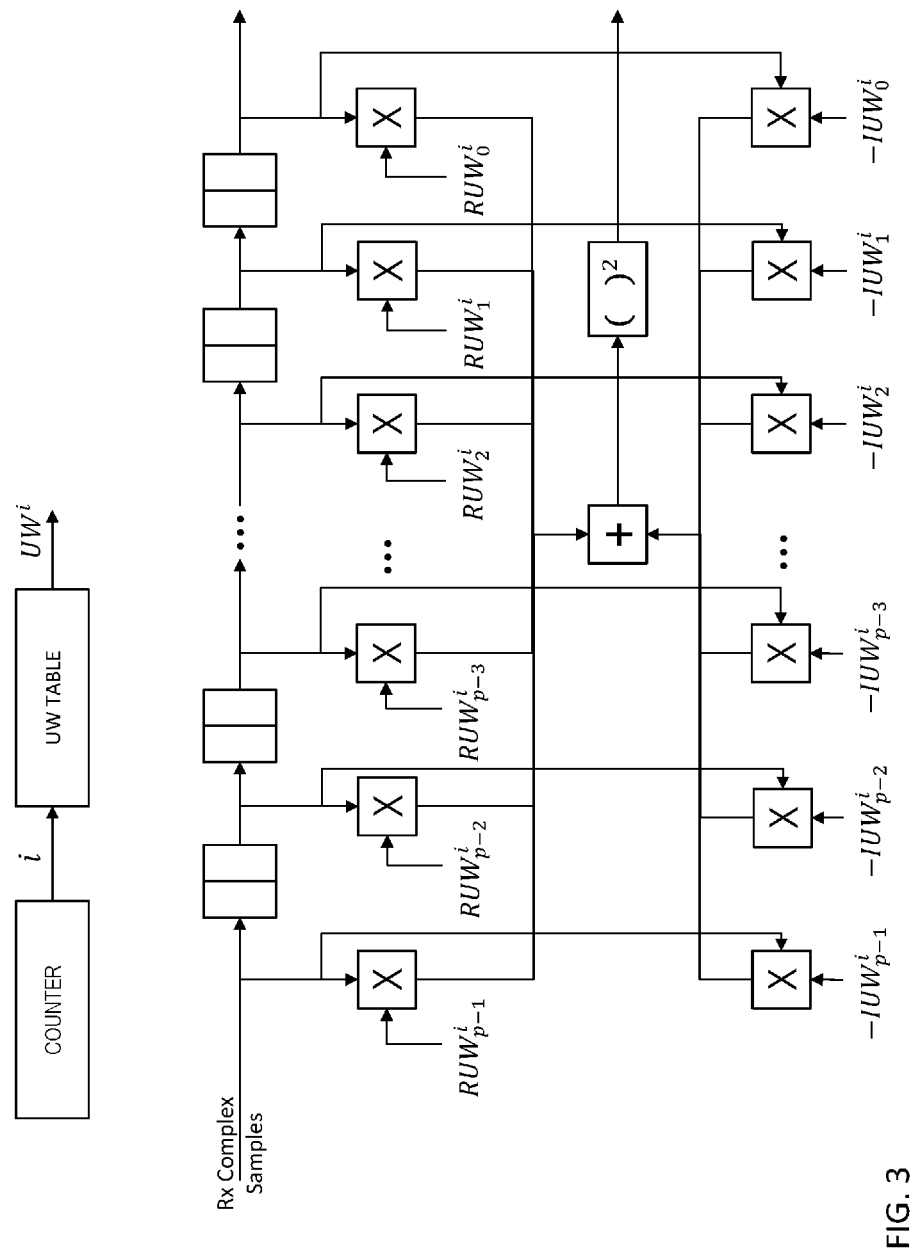
FIG. 3 illustrates a block diagram of a parallel unique word (UW) correlator of a complex receiver sampling scheme for QPSK modulation, in accordance with example embodiments of the present invention.
Figure 4:
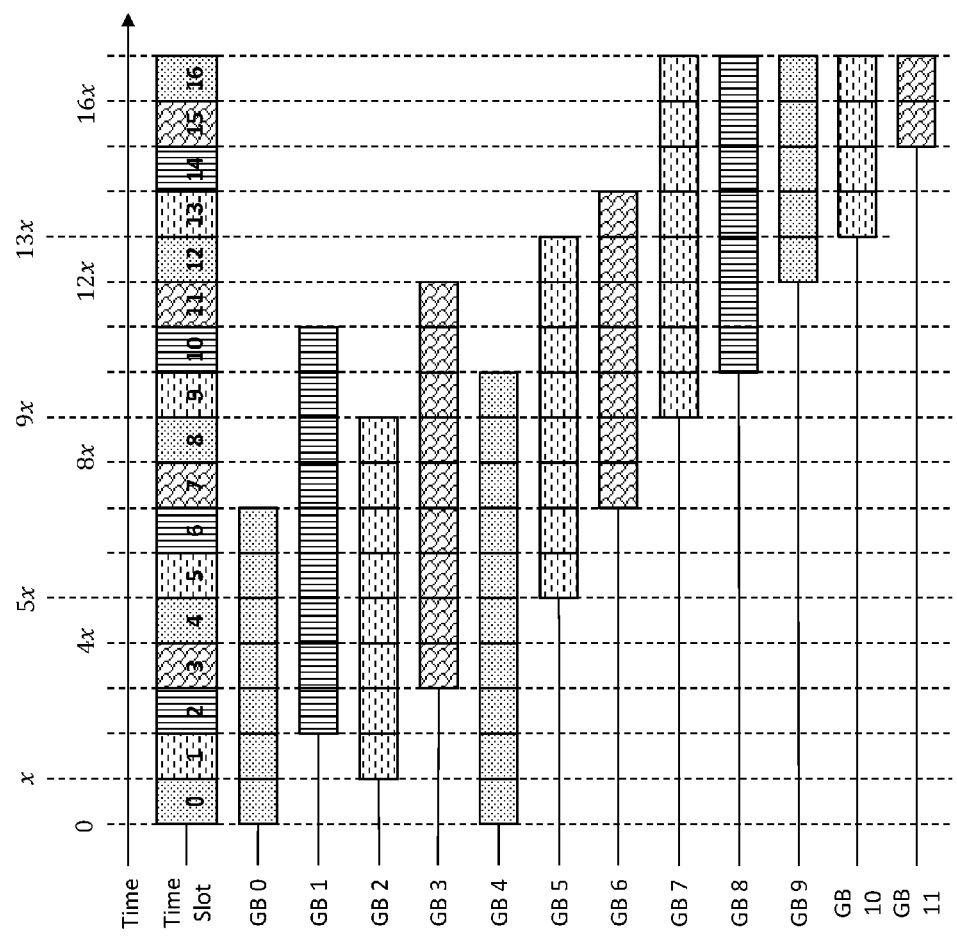
FIG. 4 illustrates a block diagram depicting a series of group burst transmissions within respective time slots, where a pool of unique words (UWs) is divided into 4 sets, and each UW is associated with one of the time slots in modulo 4 (as identified by a respective fill pattern), in accordance with example embodiments of the present invention.

FIG. 3 illustrates a block diagram of a parallel unique word correlator of a complex receiver sampling scheme for QPSK modulation, in accordance with example embodiments of the present invention. Two samples are used to represent a modulation symbol. At a sampling clock cycle, the correlator will shift in one received sample, and correlate (one at a time) with all n possible UWs of width p bits each. With reference to FIG. 4, $UW^i$ reflects the $i^{th}$ UW in the receiver table (the UW in the table indexed by the index i), which can be expressed in its real and imaginary components as $RUW^i$ and $IUW^i$, respectively ($UW^i=[RUW^i, IUW^i]$). Further, the real and imaginary components can be represented in binary format, as follows:

$$RUW^i=\{RUW_0^i, RUW_1^i, RUW_2^i, \ldots, RUW_{p-2}^i, RUW_{p-1}^i\}$$

$$IUW^i=\{IUW_0^i, IUW_1^i, IUW_2^i, \ldots, IUW_{p-2}^i, IUW_{p-1}^i\}$$

In this binary format, a 0 means a "+1" and a multiply by 0 means "passing through." Similarly, a 1 means a "4", and multiply by 1 means "2's complement". All n UWs of the table programmed or stored in the receiver should be cycled through within the one sample duration. Alternatively, in the case where the universe of UWs is segregated into subsets or pools (e.g., applied on a beam-by-beam basis, as described above), then a given receiver need only cycle through all UWs of its respective pool. Similarly, the cycling through a respective pool should also be completed within the one sample duration. The result of the correlation or the interpolated correlation peak output is compared against an adjustable detection threshold. The value of the threshold is determined by a classical tradeoff between probability of miss-detect and false-alarm. Once a UW passes the threshold, its index is marked and the UW and associated initial scrambling vector or seed is used by the receiver for the further decoding and descrambling of the respective data signal.

Further, the correlation results may be used to estimate the initial phase of the particular burst, and the correlator output may be used to estimate the power level of the burst. Additionally, the peak of the correlator value, along with the value adjacent to the peak, may be used to estimate the timing of the start of the burst. All these burst parameter values may also be used by the receiver for the further decoding and descrambling of the respective data signal. The same general approach is applicable for Offset-QPSK (OQPSK) modulated signals. Because OQPSK offsets the Imaginary part of the signal by half a symbol before it is transmitted, the lower half the correlator of FIG. 3 would thus take the complex sample inputs by the same half symbol offset. In other words, it will take inputs from one element later, instead of the same as the top half of the correlator. The various algorithms that may be employed to estimate these burst parameter values are beyond the scope of the embodiments of the present invention, as they would be readily known to one of skill in the art—and thus are not discussed herein.

As discussed above, In accordance with example embodiments, SCMA can be employed as a means to send short messages directly via a random access contention channel, without requiring the assignment of dedicated channel bandwidth. Such applications of SCMA are becoming increasingly important with the growing deployment and use of delay sensitive applications that cannot tolerate the added latency associated with the process for acquiring such dedicated channel bandwidth. For example, reduction of latency has become more important for web browsing applications, in order to provide an enhanced user experience. With respect to web browsing, each webpage request transmitted by the client terminal or web browser typically requires more data to be transmitted, as webpages have become more complex. For example, on average, a typical webpage contains upwards of 30-60 objects, and each object request, on average, requires over 500 bytes of data. Further, at typically less than 120 bytes per SCMA burst (for example), the request for each object would require more than 4 SCMA bursts. When the request is not encrypted, the problem can be mitigated somewhat by prefetching, as the gateway can anticipate the objects to be requested if the title page of the request is known. With increasing percentages of websites employing secure connections (e.g., HTTPS), however, prefetching becomes impractical (if not impossible) for such sites. Moreover, messaging over an SCMA contention channel for other applications may similarly entail several successive SCMA bursts for the complete message. For example, with a typical Internet Protocol (IP) packet, once encoded via the respective FEC code, the resulting information and parity bits would require several SCMA bursts to carry the information of the whole IP packet. Further, a single message may even consist of multiple IP packets, which would multiply the number of resulting SCMA bursts for the entire message.

On the receiver side, with the UW approaches for SCMA (discussed above), the SCMA receiver becomes significantly more complicated as compared to an SCMA receiver that does not employ such UW approaches or to a plain TDMA receiver. With a longer message that requires several SCMA bursts for transmission, the message is broken up into multiple bursts which are sequentially transmitted over the contention channel. Each burst is thereby independently transmitted with the respective UW, and thus independently received and processed by the receiver. Accordingly, at the receiver, the receiver is required to detect and correlate the UW for each such burst, which requires the cycling through of all possible UWs for each burst. Moreover, the most computationally intensive part of the SCMA burst processing at the receiver consists of the performance of a search for all possible UWs expected within each symbol timing interval within the aperture of a time slot. Further, with each request for an object averaging more than 4 SCMA bursts on average (as outlined above), each successive request by the terminal for an object on that webpage would entail an additional 8 SCMA bursts. As a result, for each individual request message of the transmitting terminal for a further webpage object, the receiver must repeat the same initial UW processing for each burst of each request. This results in a significant level of initial processing for each request message (consisting of the sequential transmission of several SCMA bursts by the requesting terminal) received over the SCMA contention channel.

In order to reduce the complexity and processing burden on the receiver with regard to such sequential message bursts, therefore, example embodiments of the present invention provide approaches that take advantage of the fact that, where a contention channel message requires a sequence of multiple SCMA bursts to complete the transmission (from the same transmitter), each burst will utilize the same UW. Also, each of the SCMA bursts from the same terminal should have the same time offset from the slot boundary, as the SCMA bursts are transmitted consecutively slot by slot. According to approaches of example embodiments, therefore, based on the known burst position from slot to slot, the required processing for each burst can be reduced, which in turn reduces the UW search processing.

Such approaches reduce the initial UW processing burdens of the receiver, according to one embodiment, by partitioning the terminals utilizing an SCMA contention channel into two groups. One group consists of terminals newly accessing the SCMA channel, and the other group consists of terminals continuing a prior access of the SCMA channel. By way of example, to segregate the new entrance population from the continuing access population, different sets of UW patterns are used in successive time slots. The new entrance terminals can be modeled as the arrival rate of a stochastic process, and the continuing access terminals represent the duration of the arrivals. The product of the arrival and its duration reflects the traffic load that the SCMA channel is designed to handle. In other words, the new arrival rate reflects the rate of new arrivals, and the duration of the continuing access for each terminal reflects the duration of that terminals overall transmissions after the respective new arrival. Accordingly, the overall load is the number of new arrivals times the duration of the continued access of each such new arrival. Since the collision probability proportionately decreases with the arrival rate, to maintain a constant collision probability, the number of UWs can proportionately decrease with the decrease in the arrival rate.

In other words, by way of example, a distinct set of UWs is assigned to each time slot, and a terminal beginning a transmission in a particular time slot chooses a UW from the set of UWs assigned to that time slot. Then for successive transmissions by the same terminal, the terminal uses the same UW. Then, for each time slot, the receiver searches for new terminal entrants by searching for only UWs from the set of UWs assigned to that time slot, and confirms that continued transmissions from prior entrants are present in the successive time slot. The terminal keeps track of prior entrant UWs, and, once a time slot occurs without a UW from a one of the tracked prior entrants, the receiver assumes that the respective terminal has completed its message transmission or contention channel access and removes that UW from the tracked list. Each set contains sufficient number of UW patterns to reduce the collision probability to a desirable rate as dictated by the expected arrival rate of the user traffic. By way of further example, the number of UW groups for new entrants would be a fixed number n, and the sequence of UW group assignments to respective time slots would be repeated every n time slots. In other words, each set of UWs is available or assigned on a time continuum for each time slot that occurs at an equivalent to successive time offset starting from a reference point or synchronization point in the timing of a transmission sequence of a given channel. With regard to potential new entrants (new terminals accessing the SCMA channel), as part of the initial UW processing for each time slot, the receiver performs a search within the time slot for all possible UWs only from the new entrant UW set assigned to the respective time slot, along with a search for the particular UW of continued successive burst transmissions from each terminal that accessed the SCMA channel at a prior time slot (which is based on a list of UWs being tracked from such prior entrants).

For example, if a terminal 1 desires to begin a group burst transmission at time slot 0, then the terminal would select a UW from the group of UWs assigned to time slot 0 and continue the group burst for successive time slots using the same UW. Similarly, if another terminal 2 also desires to begin a group burst transmission at time slot 0, then the terminal would select ideally a different UW from the group of UWs assigned to time slot 0 and continue the group burst for successive time slots using the same UW. If another terminal 3 desires to begin a group burst transmission at time slot 1, then the terminal would select a UW from the group of UWs assigned to time slot 1 and continue the group burst for successive time slots using the same UW. For this example, it is assumed that, at time slot 0, the receiver is not tracking any prior entrant UWs from prior time slots. At time slot 0, the receiver would perform the initial UW processing by searching for all UWs assigned to time slot 0 to detect any new terminal entrants at that time slot, and would detect the UWs from the transmissions of the terminals 1 and 2. Then, at time slot 1, the receiver would perform the initial UW processing by searching for all UWs assigned to time slot 1 to detect any new terminal entrants at that time slot, and would detect the UW from the transmission of the terminal 3. Further, the receiver would be keeping track of prior entrant UWs (in this case, the UWs utilized by terminals 1 and 2, respectively, at time slot 0), and thus, at time slot 1, the receiver would also perform a relatively simple determination that the UWs of the terminals 1 and 2 are also present in time slot 1 (signifying the continued GB transmission from each terminal). This determination would consist of a search for the UW of terminal 1 and the UW of terminal 2 in the time slot 1, at the relative same respective offsets within the time slot as that of the time slot 0. Once the receiver determines that a prior UW being tracked for a continued transmission of a terminal is not present within a time slot, the receiver assumes that the respective GB of that terminal has been completed and accordingly removes the respective UW from the list of prior UWs being tracked from prior terminal entrants.

With the foregoing example, however, because there is no coordination between terminals, there is no guarantee that two terminals transmitting within the same SCMA burst or time slot would each chose a different UW from the UW group assigned for that time slot. In accordance with example embodiments, therefore, approaches are employed to decrease the possibility that two such terminals would chose the same UW for a transmission in a common SCMA slot. According to one such embodiment, the terminal 1 would randomly select a UW from the group of UWs assigned to time slot 0 for its burst transmissions in time slot 0 and in successive time slots. Similarly, the terminal 2 would also randomly select the UW for its burst transmissions in time slot 0 and in successive time slots from the group of UWs assigned to time slot 0. By way of example, at the time the terminal 1 desires to access the contention channel at the respective time slot (time slot 0 in this example), the terminal would generate a modulo n random number and would use the generated random number as an index into a table of the UWs assigned to that time slot (where n is equal to the number of UWs assigned to the time slot). Similarly, at the time the terminal 2 desires to access the contention channel at the respective time slot (again, time slot 0 in this example), that terminal would also generate a modulo n random number and would use the generated random number as an index into a table of the UWs assigned to that time slot. Accordingly, with such an example embodiment, the distribution of UWs and terminal groups is randomized and continually changing, which dynamic randomization should contribute to diminished collision probabilities. It should be noted, however, that because modulo n is a many-to-one mapping, the probability that two terminals may use the same UW at the same time within the same time slot is still a non-zero probability.

To realize further computation reduction, according to a further embodiment, the terminals can be segregated into n groups, and the SCMA time slots would be numbered in modulo n. Then, a terminal in the $k^{th}$ group would be permitted to begin a message burst transmission in only a time slot numbered k modulo n, and continue for every slot until it completes its message transmission. According to preliminary simulation analysis, with n=8 and a total pool of >255 UWs, the number of clock cycles needed to process an SCMA carrier can be halved, thus doubling the number of channels can be processed by the same receiver. The size of n, however, reflects a tradeoff between probability of collisions, which is determined by the number of UWs usable by a group of terminals, and the computation complexity reduction. By way of example, based on analyses, 4<n<16 appears to be a practical choice.

FIG. 4 illustrates a block diagram depicting a series of group burst transmissions within respective time slots, where a pool of unique words (UWs) is divided into 4 sets, and each UW is associated with one of the time slots in modulo 4 (as identified by a respective fill pattern), in accordance with example embodiments of the present invention. Accordingly, FIG. 4 shows an example for n=4. The time slots are divided into 4 groups, each with a distinct fill pattern, and each fill pattern is associated with a respective group or pool of UWs. In other words (as mentioned above), each set of UWs is available or assigned on a time continuum for each time slot that occurs at an equivalent to successive time offset starting from a reference point or synchronization point in the timing of a transmission sequence of a given channel. With reference to FIG. 4, the UWs associated with the fill pattern of the time slot 0 would be available or assigned to time slots occurring at time 0, time 4x, time 8x, time 12x, 16x . . . , and the UWs associated with the fill pattern of the time slot 1 would be available or assigned to time slots occurring at time x, time 5x, time 9x, time 13x, . . . (where x is the length of a time slot). A request consists of a variable length of SCMA bursts, which are each called a "Group Burst" or GB (e.g., GB 0, GB 1, . . . , GB 11 shown in FIG. 4). For example, a group burst may reflect an HTTP or HTTPS request of a particular terminal, transmitted in successive SCMA bursts over a contention channel. A GB started in one of the pattern slots will continue for a number of time slots, and there may be different GBs that start at the same time slot. Each GB of a different terminal that starts at a particular time slot will use a UW randomly selected from the pool of UWs for that time slot. The UW detector will search for the UW associated with that particular pool, plus those GBs detected previously to confirm the continuation of the GBs. If a UW from the previous time slot is no longer detected in the current slot, the receiver assumes that the GB is complete, and it is removed from the list of UW it needs to track at the next time slot. Each group burst initially transmitted in a slot uses a UW from the respective pool, and continues to use the same UW for the remaining SCMA bursts of the GB.

For example, with reference to FIG. 4, the terminals transmitting GB 0 and GB 4 are each assigned to begin a GB transmission at a time slot assigned with the UW pool designated by the fill pattern of time slots 0, 4, 8, 12, 16, . . . . Similarly, the terminals transmitting the GB 3, GB6, GB 11 are each assigned to begin a GB transmission at a time slot assigned with the UW pool designated by the fill pattern of time slots 3, 7, 11, 15, . . . . As shown in the figure, the GB 0 and the GB 4 begin at time slot 0, the GB 1 begins at time slot 2, the GB 2 begins at time slot 1, and the GB 3 begins at time slot 3. At time slot 0, the receiver performs a search for all UWs associated with the fill pattern of time slot 0, and detects the UW of the initial burst of the GB 0 and the UW of the initial burst of the GB 4. The receiver then can decode the initial burst of the GB 0 based on the scrambling signature or initial vector associated with the detected UW of the GB 0, and can decode the initial burst of the GB 4 based on the scrambling signature or initial vector associated with the detected UW of the GB 4. Then, at time slot 1, the receiver performs a search for all UWs associated with the fill pattern of time slot 1, and detects the UW of the initial burst of the GB 2. At time slot 1, the receiver also performs a search for the UW of the GB 0 and the UW of the GB 4 to determine that a successive burst of each of GB 0 and GB 4 is contained within the time slot 1. Then, at time slot 2, the receiver performs a search for all UWs associate with the fill pattern of time slot 2, and detects the UW of the initial burst of the GB 1. At time slot 2, the receiver also performs a search for the UW of the GB 0, UW of the GB 4 and the UW of the GB 2 to determine that a successive burst of each of GB 0, GB 4 and GB 2 is contained within the time slot 2. Later in the sequence, at time slot 7, the receiver detects that a burst with the UW of the GB 0 is not contained within that timeslot. The receiver thus assumes that the GB 0 has been completed and ceases the search for the respective UW in successive time slots (except that the receiver does search for that same UW within the next time slot to which the respective pool of UWs is assigned). The process continues in a similar manner through time slot 16 and the detection of the successive group bursts 5 through 11.

In accordance with further example embodiments, various approaches are provided to reduce the probability of data burst collisions. According to one such embodiment, the terminals may be segregated into groups, where each group would be permitted to begin a GB transmission at only certain time slots. In other words, each group is associated with a respective UW pool (or each terminal of a particular group is permitted to begin a GB message transmission at only a time slot associated with a respective UW pool). Such a scheme, however, reduces each terminal's access to the respective contention channel and thereby increases latency by forcing the terminal to wait for an assigned time slot to access the channel and transmit its data. This latency, however, is only introduced at the beginning of a respective GB transmission, because, once the terminal accesses the SCMA channel at the respective time slot, the terminal continues that GB transmission in successive time slots. By way of example, a fixed assignment of a UW pool may be set for each terminal. For example, the assignment may be fixed as a modulo n function of the manufacturing serial number, where n represents the number of UW pools. According to another such embodiment, the system may be configured whereby, all the terminals may select a UW and scrambling signature or initial scrambling vector from the UW pool available or assigned to the time slot at the time that the terminal begins the GB transmission. Accordingly, with this approach, each terminal would have to store the UWs and respective seeds for each of the UW pools.

Figure 5:
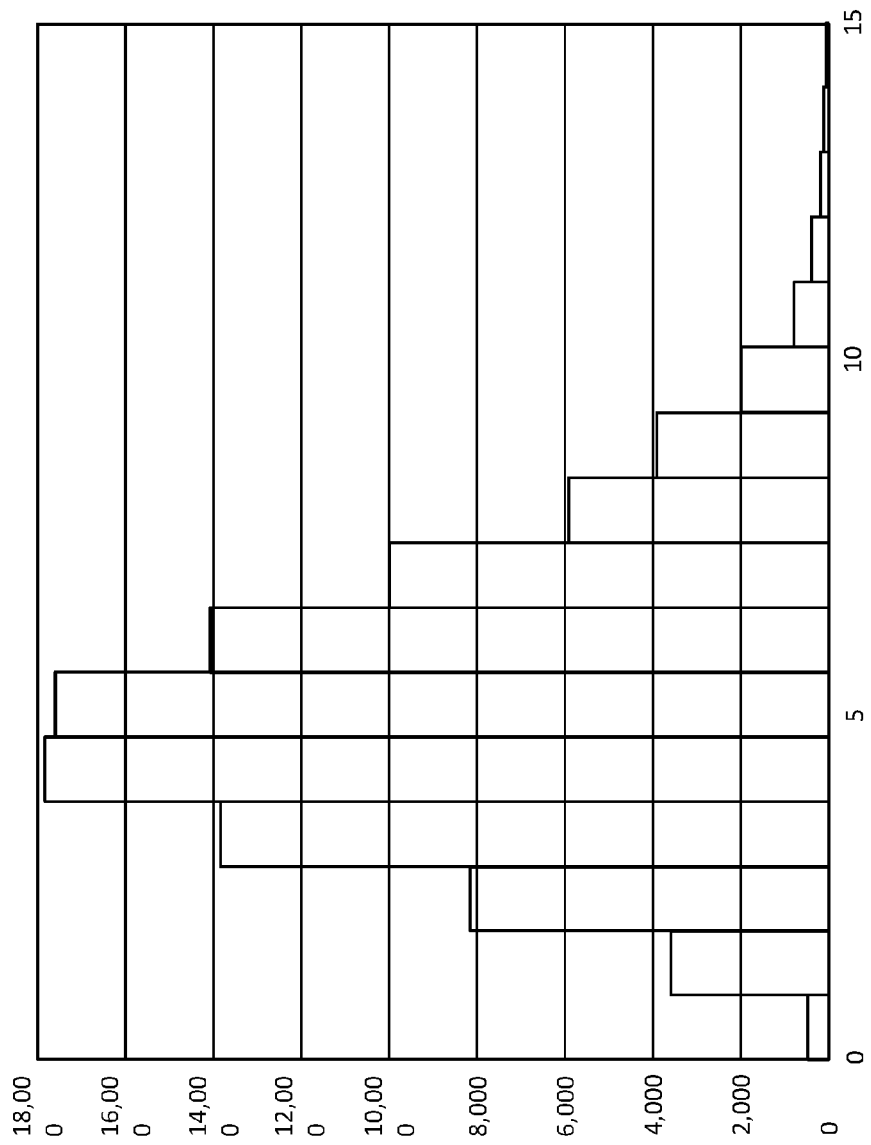
FIG. 5 illustrates a bar graph depicting the relative frequency of occurrence of simultaneous transmission with a mean Poison arrival rate of 4, over a total of 50,000 SCMA burst transmissions, in accordance with example embodiments of the present invention.

In accordance with further example embodiments, speed advantages can be achieved by early termination and statistical multiplexing. Within each time slot, the number of simultaneous transmissions is a random variable. The received power from each transmitting terminal is also a random variable, within some limits. As a result, some transmitted bursts can be demodulated and decoded without error earlier and some bursts will take a longer time to decode and demodulate. In particular, the detection and demodulation process is much easier if the number of simultaneous transmissions in a time slot is relatively small; whereas it may take significantly longer amount of time when the number of simultaneous transmission is relatively large. Typically, packet arrival rates can be modeled as Poisson distribution. Even with different packet lengths (typically modeled as exponential distribution), the number of simultaneous transmissions in each time slot is still a Poison distribution. FIG. 5 illustrates a bar graph depicting the relative frequency of occurrence of simultaneous transmissions with a mean Poison arrival rate of 4, over a total of 50,000 SCMA burst transmissions, in accordance with example embodiments of the present invention.

Figure 6:
FIG. 6 illustrates a block diagram depicting input buffer(s) implemented in front of the SCMA receiver processor to allow the receiver to decode more difficult time-slots, in accordance with example embodiments of the present invention.

In accordance with one embodiment, for a single channel, receiver complexity can be reduced by including a front-end buffer with early termination. FIG. 6 illustrates a block diagram depicting input buffer(s) implemented in front of the SCMA receiver processor to allow the receiver to decode more difficult time-slots, in accordance with example embodiments of the present invention. The buffer would be implemented between the channel down-converter and SCMA receiver processor, as illustrated in FIG. 6. The front-end buffer is sized to be sufficient to store a fixed number of SCMA time slots x (in unprocessed samples). Since the receiver processor may take a variable processing time to completely decode each burst, the front end buffer ensures that the incoming samples from the next x time slots worth of samples are not lost when the SCMA receiver is lagging behind. When a particularly difficult to decode slot is completed, the processor can catch up to work off the samples queued in the front end buffer. In other words, because the decoding process depends on the number of bursts received and the difficulty in decoding each such burst (e.g., based on a number of required iterations for interference cancellation, and the employment of early termination of the decode iteration processing), the processing is statistically variable. The front end buffer facilitates the smoothing out of the decode processing and the work load of the SCMA Rx processor, which increases the processing speed and efficiency of the SCMA Rx processor.

By way of example, the SCMA contention channel utilizes a powerful forward error correction encoding, such as a Low Density Parity Check (LDPC) code. In such a case, when all the parity check equations of the LDPC code are satisfied, the burst can be considered as correctly decoded. Further, the encoding may also include a Cyclic Redundancy Check (CRC) code with the information parts of a burst. The decoded burst would accordingly be considered correct if CRC checks correctly. Either mechanism provides the receiver a mechanism for early iteration termination in the decoding process. Accordingly, once all the simultaneous transmissions of a time slot are successfully decoded, the receiver stops further iterations of interference cancellation, outputs the results, and starts to process the next SCMA time slot. In this manner, the receiver can be sized for slightly above average load, instead of the maximum load. Part of the peak vs. average load gain is contributed by the nature of random arrival. Further, the number of interference cancellation iterations required to achieve correct results can be significantly less when fewer bursts are transmitted in an SCMA slot, due to significantly less interference. The receiver can stop processing, output results, and start the next time slot when it believes all the bursts in the time slot are decoded correctly. The front end buffer and early termination significantly reduces the iterative interference processing complexity.

Figure 7:
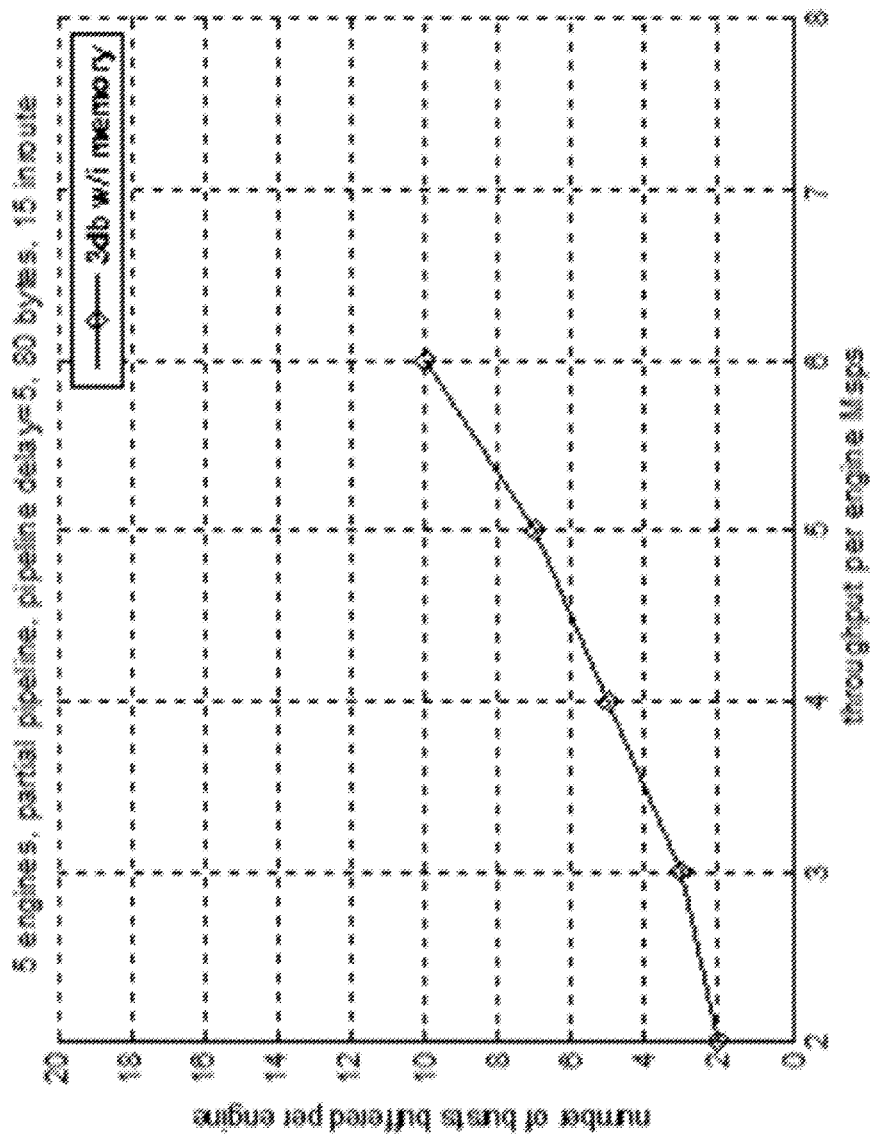
FIG. 7 illustrates simulation results showing the size of a frond-end buffer required for an SCMA interference cancellation/decoding engine as a function of the processing throughput of the engine, in accordance with example embodiments of the present invention.

FIG. 7 illustrates simulation results showing the size of a frond-end buffer required for an SCMA interference cancellation/decoding engine as a function of the processing throughput of the engine, in accordance with example embodiments of the present invention. The size of the front end buffer is designed to smooth out the processing load of the SCMA receiver. FIG. 7 shows the number of frond-end buffer required for an SCMA interference cancellation/decoding engine as a function of the processing throughput of the engine. The throughput increased from 2 Msps to 6 Msps as the size of the buffer increased from 2 SCMA slots to 10 SCMA slots. At a nominal SCMA operating point, a larger front end buffer reduces the idle time of the receiver. For a given receiver implementation, higher throughput equates to reduced complexity on the average.

Figure 8:
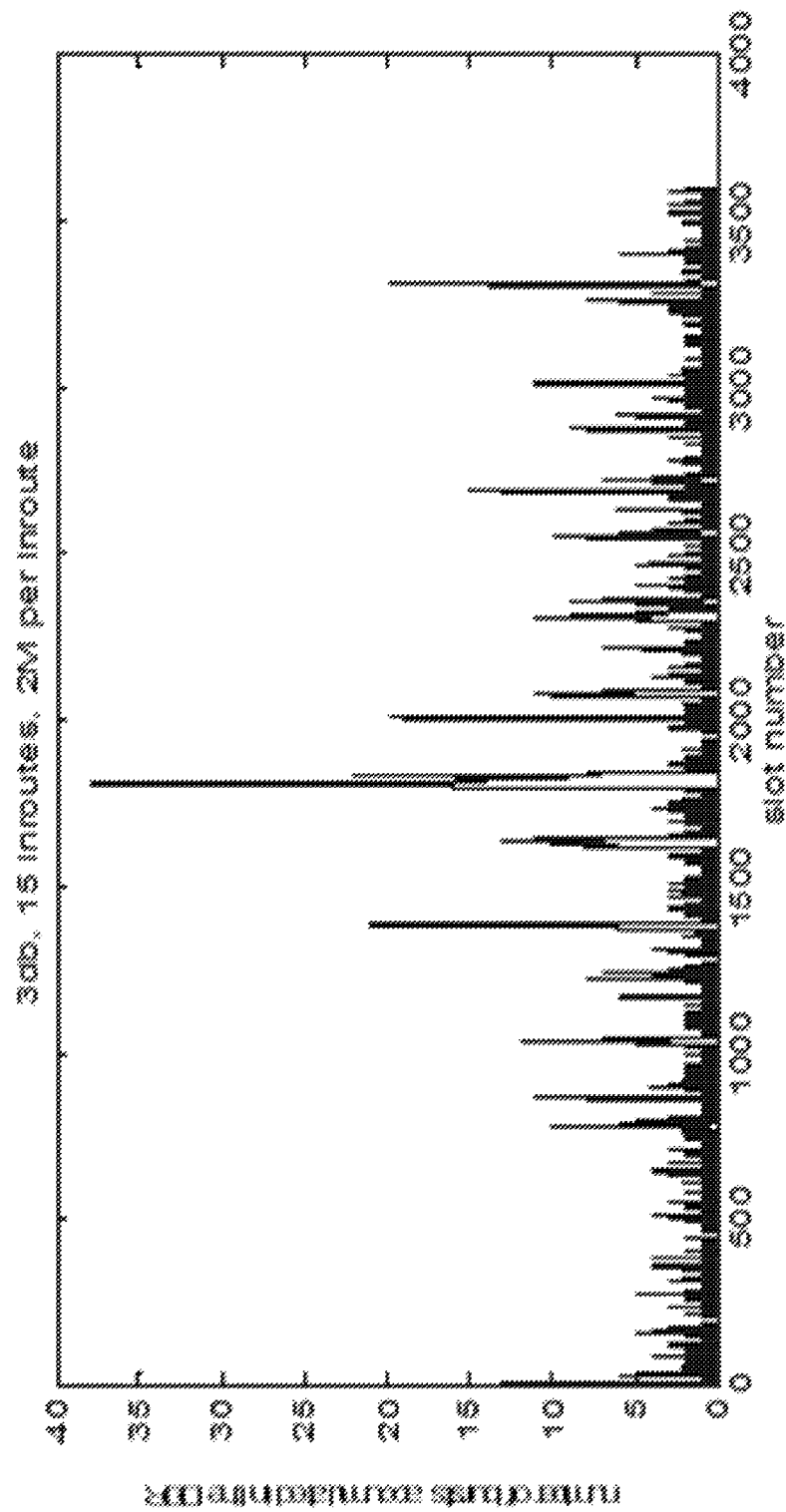
FIG. 8 illustrates simulation results showing the time series of the number of SCMA bursts queued in the front end buffer, with 15 SCMA carriers as an input, and 5 SCMA interference cancellation engines serving the queue, in accordance with example embodiments of the present invention.
Figure 9:
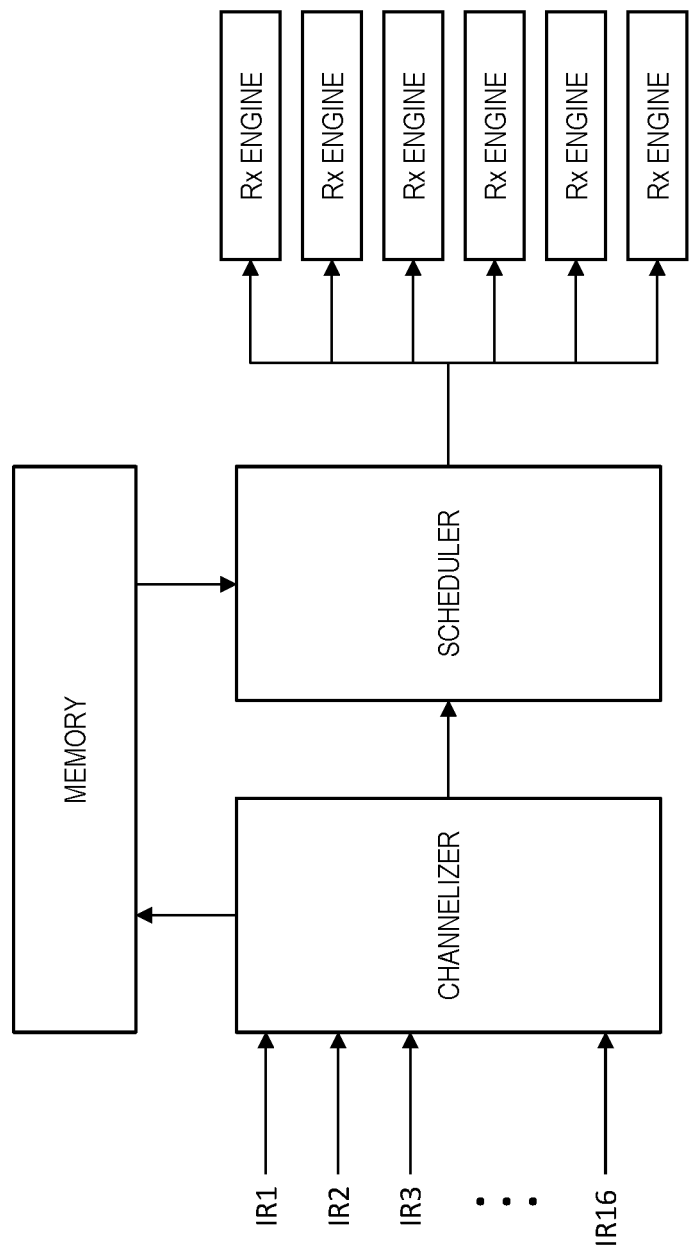
FIG. 9 illustrates a block diagram depicting a receiver with inputs of 16 SCMA carriers processed by 6 SCMA interference cancellation engines employed after the front end buffer, in accordance with example embodiments of the present invention.

In accordance with a further embodiment, for higher efficiency, the average front end buffer size can be further reduced with the employment of statistical multiplexing among a large number of SCMA carriers. FIG. 8 illustrates simulation results showing the time series of the number of SCMA bursts queued in the front end buffer, with 15 SCMA carriers as an input, and 5 SCMA interference cancellation engines serving the queue, in accordance with example embodiments of the present invention. With reference to FIG. 8, a total of 50 slots worth of front-end buffer were shared among 15 SCMA carriers, each operating at 2 Msps, for a total of 30 Msps throughput. They are handled by 5 SCMA interference cancellation engines, each operating at 6 Msps. As shown, the buffer queue length is typically 2 SCMA slots, but at some points it peaks above 35 SCMA slots, but the queue rarely grows beyond 20 SCMA slots. As is evident, with further multiplexing between carriers and multiple interference cancellation engines, a highly efficient receiver implementation is achieved. FIG. 9 illustrates a block diagram depicting a receiver with inputs of 16 SCMA carriers processed by 6 SCMA interference cancellation engines employed after the front end buffer, in accordance with example embodiments of the present invention.

The term "computer-readable medium" as used herein refers to any medium that participates in providing instructions to the processor 403 for execution. Such a medium may take many forms, including but not limited to nonvolatile media, and volatile media. Non-volatile media include, for example, optical or magnetic disks, such as storage device 409. Volatile media may include dynamic memory, such as main memory 405. Common forms of computer-readable media include, for example, a floppy disk, a flexible disk, hard disk, magnetic tape, any other magnetic medium, a CD ROM, CDRW, DVD, any other optical medium, RAM, PROM, and EPROM, FLASH EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving a data communications signal via a random access channel of a wireless communications network;
processing the data communications signal to search for data bursts in a first time-slot of the random access channel that include any one of a first set of signature sequences assigned to the first time-slot, and determining that a data burst A in the first time-slot includes a first one of the first set of signature sequences assigned to the first time-slot, and, based on this determination, resolving that the data burst A in the first time-slot is an initial burst of a message from a first communications terminal;
processing the data communications signal to determine whether a second time-slot of the random access channel directly following the first time-slot includes a data burst B that includes the first one of the first set of signature sequences assigned to the first time-slot; and
in a circumstance when it is determined that the second time-slot includes the data burst B, resolving that the message from the first communications terminal is a multi-burst message and that the data burst B is a second burst of the multi-burst message from the first communications terminal; and
in a circumstance when it is determined that the second time-slot does not include the data burst B, resolving that the message from the first communications terminal is a single-burst message that has been completed via the first time-slot.

2. The method according to claim 1, wherein, in the circumstance when it is determined that the second time-slot includes the data burst B, the method further comprises:
processing the data communications signal to determine whether a third time-slot of the random access channel directly following the second time-slot includes a data burst C that includes the first one of the first set of signature sequences assigned to the first time-slot; and
in a circumstance when it is determined that the third time-slot includes the data burst C, resolving that the data burst C is a third burst of the multi-burst message from the first communications terminal; and
in a circumstance when it is determined that the third time-slot does not include the data burst C, resolving that the multi-burst message from the first communications terminal has been completed via the second time-slot.

3. The method according to claim 2, wherein, in the circumstance when it is determined that the third time-slot includes the data burst C, the method further comprises:
processing the data communications signal to determine whether subsequent time-slots of the random access channel respectively include further data bursts that each includes the first one of the first set of signature sequences assigned to the first time-slot; and
in a circumstance when it is determined that one or more of such subsequent time-slots of the random access channel respectively include such further data bursts, resolving that each of such further data bursts is a respective subsequent burst of the multi-burst message from the first communications terminal; and
in a circumstance when it is determined that a one of such subsequent time-slots of the random access channel does not include any such further data burst, resolving that the multi-burst message from the first communications terminal has been completed via a time-slot directly preceding the one of such subsequent time-slots of the random access channel that does not include any such further data burst.

4. The method according to claim 1, further comprising:
determining that a data burst AA in the first time-slot includes a second one of the first set of signature sequences assigned to the first time-slot, and, based on this determination, resolving that the data burst AA in the first time-slot is an initial burst of a message from a second communications terminal;
processing the data communications signal to determine whether the second time-slot of the random access channel includes a data burst BB that includes the second one of the first set of signature sequences assigned to the first time-slot; and
in a circumstance when it is determined that the second time-slot includes the data burst BB, resolving that the message from the second communications terminal is a multi-burst message and that the data burst BB is a second burst of the multi-burst message from the second communications terminal; and
in a circumstance when it is determined that the second time-slot does not include the data burst BB, resolving that the message from the second communications terminal is a single-burst message that has been completed via the first time-slot.

5. The method according to claim 1, further comprising:
processing the data communications signal to search for data bursts in a future time-slot of the random access channel that include any one of a further set of signature sequences assigned to the future time-slot, and determining that a data burst AAA in the future time-slot includes a first one of the further set of signature sequences assigned to the future time-slot, and, based on this determination, resolving that the data burst AAA in the future time-slot is an initial burst of a message from a further communications terminal.

6. The method according to claim 5, further comprising:
processing the data communications signal to determine whether a first subsequent time-slot of the random access channel directly following the future time-slot includes a data burst BBB that includes the first one of the further set of signature sequences assigned to the future time-slot; and
in a circumstance when it is determined that the first subsequent time-slot of the random access channel includes the data burst BBB, resolving that the message from the further communications terminal is a multi-burst message and that the data burst BBB is a second burst of the multi-burst message from the further communications terminal; and
in a circumstance when it is determined that the first subsequent time-slot of the random access channel does not include the data burst BBB, resolving that the message from the further communications terminal is a single-burst message that has been completed via the future time-slot.

7. The method according to claim 6, wherein, in the circumstance when it is determined that the first subsequent time-slot of the random access channel directly following the future time-slot includes the data burst BBB, the method further comprises:
processing the data communications signal to determine whether a second subsequent time-slot of the random access channel directly following the first subsequent time-slot includes a data burst CCC that includes the first one of the first set of signature sequences assigned to the future time-slot; and
in a circumstance when it is determined that the second subsequent time-slot of the random access channel includes the data burst CCC, resolving that the data burst CCC is a third burst of the multi-burst message from the further communications terminal; and
in a circumstance when it is determined that the second subsequent time-slot of the random access channel does not include the data burst CCC, resolving that the multi-burst message from the further communications terminal has been completed via the first subsequent time-slot.

8. The method according to claim 7, wherein, in the circumstance when it is determined that the second subsequent time-slot of the random access channel includes the data burst CCC, the method further comprises:
processing the data communications signal to determine whether further subsequent time-slots of the random access channel respectively include further data bursts that each includes the first one of the further set of signature sequences assigned to the future time-slot; and
in a circumstance when it is determined that one or more of such further subsequent time-slots of the random access channel respectively include such further data bursts, resolving that each of such further data bursts is a respective subsequent burst of the multi-burst message from the further communications terminal; and
in a circumstance when it is determined that a one of such further subsequent time-slots of the random access channel does not include any such further data burst, resolving that the multi-burst message from the further communications terminal has been completed via a time-slot directly preceding the one of such further subsequent time-slots of the random access channel that does not include any such further data burst.

9. A communications terminal comprising:
a receiver configured to receive a data communications signal via a random access channel of a wireless communications network; and
a processor configured to process the data communications signal to search for data bursts in a first time-slot of the random access channel that include any one of a first set of signature sequences assigned to the first time-slot, wherein, in a circumstance when the processor determines that a data burst A in the first time-slot includes a first one of the first set of signature sequences assigned to the first time-slot, the processor is configured to resolve that the data burst A in the first time-slot is an initial burst of a message from a first communications terminal; and
wherein the processor is further configured to process the data communications signal to determine whether a second time-slot of the random access channel directly following the first time-slot includes a data burst B that includes the first one of the first set of signature sequences assigned to the first time-slot; and
in a circumstance when the processor determines that the second time-slot includes the data burst B, the processor is configured to resolve that the message from the first communications terminal is a multi-burst message and that the data burst B is a second burst of the multi-burst message from the first communications terminal; and in a circumstance when the processor determines that the second time-slot does not include the data burst B, the processor is configured to resolve that the message from the first communications terminal is a single-burst message that has been completed via the first time-slot.

10. The communications terminal according to claim 9, wherein, in the circumstance when the processor determines that the second time-slot includes the data burst B, the processor is further configured to:
process the data communications signal to determine whether a third time-slot of the random access channel directly following the second time-slot includes a data burst C that includes the first one of the first set of signature sequences assigned to the first time-slot; and
in a circumstance when the processor determines that the third time-slot includes the data burst C, the processor is configured to resolve that the data burst C is a third burst of the multi-burst message from the first communications terminal; and
in a circumstance when the processor determines that the third time-slot does not include the data burst C, the processor is configured to resolve that the multi-burst message from the first communications terminal has been completed via the second time-slot.

11. The communications terminal according to claim 10, wherein, in the circumstance when the processor determines that the third time-slot includes the data burst C, the processor is further configured to:
process the data communications signal to determine whether subsequent time-slots of the random access channel respectively include further data bursts that each includes the first one of the first set of signature sequences assigned to the first time-slot; and
in a circumstance when the processor determines that one or more of such subsequent time-slots of the random access channel respectively include such further data bursts, the processor is configured to resolve that each of such one or more subsequent time-slots of the random access channel is a respective subsequent burst of the multi-burst message from the first communications terminal; and
in a circumstance when the processor determines that a one of such subsequent time-slots of the random access channel does not include any such further data burst, the processor is configured to resolve that the multi-burst message from the first communications terminal has been completed via a time-slot directly preceding the one of such subsequent time-slots of the random access channel that does not include any such further data burst.

12. The communications terminal according to claim 9, wherein, in a circumstance when the processor determines that a data burst AA in the first time-slot includes a second one of the first set of signature sequences assigned to the first time-slot, the processor is configured to:
resolve that the data burst AA in the first time-slot is an initial burst of a message from a second communications terminal; and
process the data communications signal to determine whether the second time-slot of the random access channel includes a data burst BB that includes the second one of the first set of signature sequences assigned to the first time-slot; and
in a circumstance when the processor determines that the second time-slot includes the data burst BB, the processor is configured to resolve that the message from the second communications terminal is a multi-burst message and that the data burst BB is a second burst of the multi-burst message from the second communications terminal; and
in a circumstance when the processor determines that the second time-slot does not include the data burst BB, the processor is configured to resolve that the message from the second communications terminal is a single-burst message that has been completed via the first time-slot.

13. The communications terminal according to claim 9, wherein the processor is further configured to:
process the data communications signal to search for data bursts in a future time-slot of the random access channel that include any one of a further set of signature sequences assigned to the future time-slot, wherein, in a circumstance when the processor determines that a data burst AAA in the future time-slot includes a first one of the further set of signature sequences assigned to the future time-slot, the processor is configured to resolve that the data burst AAA in the future time-slot is an initial burst of a message from a further communications terminal.

14. The communications terminal according to claim 13, wherein the processor is further configured to:
process the data communications signal to determine whether a first subsequent time-slot of the random access channel directly following the future time-slot includes a data burst BBB that includes the first one of the further set of signature sequences assigned to the future time-slot; and
in a circumstance when the processor determines that the first subsequent time-slot of the random access channel includes the data burst BBB, the processor is configured to resolve that the message from the further communications terminal is a multi-burst message and that the data burst BBB is a second burst of the multi-burst message from the further communications terminal; and
in a circumstance when the processor determines that the first subsequent time-slot of the random access channel does not include the data burst BBB, the processor is configured to resolve that the message from the further communications terminal is a single-burst message that has been completed via the future time-slot.

15. The communications terminal according to claim 14, wherein, in the circumstance when the processor determines that the first subsequent time-slot of the random access channel directly following the future time-slot includes the data burst BBB, the processor is further configured to:
process the data communications signal to determine whether a second subsequent time-slot of the random access channel directly following the first subsequent time-slot includes a data burst CCC that includes the first one of the first set of signature sequences assigned to the future time-slot; and
in a circumstance when the processor determines that the second subsequent time-slot of the random access channel includes the data burst CCC, the processor is configured to resolve that the data burst CCC is a third burst of the multi-burst message from the further communications terminal; and
in a circumstance when the processor determines that the second subsequent time-slot of the random access channel does not include the data burst CCC, the processor is configured to resolve that the multi-burst message from the further communications terminal has been completed via the first subsequent time-slot.

16. The communications terminal according to claim 15, wherein, in the circumstance when the processor determines that the second subsequent time-slot of the random access channel includes the data burst CCC, the processor is further configured to:
- process the data communications signal to determine whether further subsequent time-slots of the random access channel respectively include further data bursts that each includes the first one of the further set of signature sequences assigned to the future time-slot; and
- in a circumstance when the processor determines that one or more of such further subsequent time-slots of the random access channel respectively include such further data bursts, the processor is configured to resolve that each of such further data bursts is a respective subsequent burst of the multi-burst message from the further communications terminal; and
- in a circumstance when the processor determines that a one of such further subsequent time-slots of the random access channel does not include any such further data burst, the processor is configured to resolve that the multi-burst message from the further communications terminal has been completed via a time-slot directly preceding the one of such further subsequent time-slots of the random access channel that does not include any such further data burst.

* * * * *